United States Patent
Ang et al.

(10) Patent No.: US 11,071,128 B2
(45) Date of Patent: Jul. 20, 2021

(54) TECHNIQUES FOR SIGNALING A CHANNEL STATE INFORMATION REQUEST AND A COMMUNICATION LINK EVENT

(71) Applicant: QUALCOMM incorporated, San Diego, CA (US)

(72) Inventors: Peter Pui Lok Ang, San Diego, CA (US); Juan Montojo, San Diego, CA (US); Wanshi Chen, San Diego, CA (US); Peter Gaal, San Diego, CA (US); Tao Luo, San Diego, CA (US); Tingfang Ji, San Diego, CA (US); Heechoon Lee, San Diego, CA (US); John Edward Smee, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 16/184,855

(22) Filed: Nov. 8, 2018

(65) Prior Publication Data
US 2019/0150172 A1 May 16, 2019

Related U.S. Application Data

(60) Provisional application No. 62/584,645, filed on Nov. 10, 2017, provisional application No. 62/588,144, filed on Nov. 17, 2017.

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0053* (2013.01); *H04L 5/0057* (2013.01);
(Continued)

(58) Field of Classification Search
CPC ......... H04W 72/1231; H04W 72/1268; H04W 72/1289; H04W 48/12; H04W 24/10; H04L 5/0007; H04L 5/0053; H04L 5/0057
See application file for complete search history.

(56) References Cited

U.S. PATENT DOCUMENTS

| | | | |
|---|---|---|---|
| 2011/0305161 A1* | 12/2011 | Ekpenyong | ........... H04L 5/0048 370/252 |
| 2012/0082049 A1* | 4/2012 | Chen | ....................... H04L 43/06 370/252 |

(Continued)

OTHER PUBLICATIONS

LG Electronics: "Further remaining Details on Wider Bandwidth Operation", 3GPP Draft, R1-1713204, Wideband, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051316013, 7 Pages, Retrieved from the Internet: URL:http://www.3gpp.org/ftp/Meetings_3GPP_SYNC/RAN1/Docs/ [retrieved on Aug. 20, 2017].

(Continued)

*Primary Examiner* — Kevin D Mew
(74) *Attorney, Agent, or Firm* — Michael J. DeHaemer, Jr.

(57) ABSTRACT

Techniques are described for signaling a downlink bandwidth part (BWP) switching event and an aperiodic channel state information (A-CSI) request in a paired spectrum environment. The base station may transmit uplink scheduling downlink control information (DCI) to a user equipment (UE) that includes the A-CSI request and an identifier for the downlink BWP of the downlink BWP switching event. After receiving the A-CSI request and the downlink BWP, the UE may perform one or more CSI measurements using the downlink BWP. The UE may use physical uplink (Continued)

shared channel (PUSCH) resources associated with the uplink scheduling DCI to transmit the CSI report to the base station. Using these techniques, the base station may be configured to indicate that a downlink BWP switching event is to occur and allocate PUSCH resources to the UE to be used to transmit the CSI report associated with the downlink BWP switching event.

28 Claims, 17 Drawing Sheets

(51) Int. Cl.
   *H04W 24/10* (2009.01)
   *H04W 48/12* (2009.01)
(52) U.S. Cl.
   CPC ....... *H04W 24/10* (2013.01); *H04W 72/1231* (2013.01); *H04L 5/0007* (2013.01); *H04W 48/12* (2013.01); *H04W 72/1289* (2013.01)

(56) References Cited

U.S. PATENT DOCUMENTS

| | | | | |
|---|---|---|---|---|
| 2012/0250549 A1* | 10/2012 | Lee | ........................ | H04L 5/0007 370/252 |
| 2013/0294351 A1* | 11/2013 | Kwon | .................... | H04W 24/10 370/328 |
| 2013/0315185 A1* | 11/2013 | Kim | ....................... | H04L 5/0057 370/329 |
| 2013/0322393 A1* | 12/2013 | Kishiyama | ............ | H04L 5/0092 370/329 |
| 2014/0023009 A1* | 1/2014 | Abe | ....................... | H04W 24/10 370/329 |
| 2014/0146775 A1* | 5/2014 | Guan | ..................... | H04L 5/0053 370/329 |
| 2016/0007350 A1* | 1/2016 | Xiong | .................... | H04W 24/10 370/252 |
| 2016/0050648 A1* | 2/2016 | Seo | .................... | H04W 72/0493 370/329 |
| 2016/0323855 A1* | 11/2016 | Nakamura | ............ | H04L 1/0016 |
| 2016/0381589 A1* | 12/2016 | Zhang | ..................... | H04L 5/001 370/252 |
| 2017/0048740 A1* | 2/2017 | Yang | ........................ | H04L 1/003 |
| 2017/0086207 A1* | 3/2017 | Yokomakura | ......... | H04W 24/10 |
| 2017/0181022 A1* | 6/2017 | Yang | .................... | H04B 7/0456 |
| 2018/0098234 A1* | 4/2018 | Kim | ..................... | H04B 7/0478 |
| 2018/0262238 A1* | 9/2018 | Yamada | ............... | H04J 11/0076 |
| 2018/0367193 A1* | 12/2018 | Tan | ....................... | H04B 7/0617 |
| 2019/0053201 A1* | 2/2019 | Nammi | ................. | H04L 1/1861 |
| 2019/0149305 A1* | 5/2019 | Zhou | ..................... | H04L 5/0048 370/330 |

OTHER PUBLICATIONS

Mediatek Inc: "Summary of Offline Discussion on Bandwidth Part Operation", 3GPP Draft, R1-1716832, Summary of Offline Discussion on BWP Operation R2, 3rd Generation Partnership Project (3GPP), Mobile Competence Centre, 650, Route Des Lucioles, F-06921 Sophia-Antipolis Cedex, vol. RAN WG1, No. Nagoya, Japan, Sep. 18, 2017-Sep. 21, 2017, Sep. 20, 2017 (Sep. 20, 2017), XP051353894, 7 Pages, Retrieved from the Internet: URL:http://www.3gpp.org/ftp/tsg_ran/WG1_RL1/TSGR1_AH/NR_AH_1709/Docs/ [retrieved on Sep. 20, 2017].
Partial International Search Report—PCT/US2018/060171—ISA/EPO—dated Mar. 1, 2019.
International Search Report and Written Opinion—PCT/US2018/060171—ISA/EPO—dated May 3, 2019.

* cited by examiner

TECHNIQUES FOR SIGNALING A CHANNEL STATE INFORMATION REQUEST AND A COMMUNICATION LINK EVENT

CROSS REFERENCES

The present Application for Patent claims the benefit of U.S. Provisional Patent Application No. 62/584,645 by ANG, et al., entitled "TECHNIQUES FOR SIGNALING A CHANNEL STATE INFORMATION REQUEST AND A COMMUNICATION LINK EVENT," filed Nov. 10, 2017, and claims the benefit of U.S. Provisional Patent Application No. 62/588,144 by ANG, et al., entitled "TECHNIQUES FOR SIGNALING A CHANNEL STATE INFORMATION REQUEST AND A COMMUNICATION LINK EVENT," filed Nov. 17, 2017, each of which is assigned to the assignee hereof, and each of which is expressly incorporated herein.

BACKGROUND

The following relates generally to wireless communication, and more specifically to techniques for signaling a channel state information request and a communication link event.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some communication systems, the base station and the UE may need to adjust their communication link to maintain a quality connection. In such events, the base station and the UE may need to measure channel conditions to perform the switching event.

SUMMARY

The described techniques relate to improved methods, systems, devices, or apparatuses that support techniques for signaling a channel state information request and a communication link event. Generally, the described techniques provide for signaling a downlink bandwidth part (BWP) switching event and an aperiodic channel state information (A-CSI) request. In some cases, in a paired spectrum environment, the base station may transmit uplink scheduling downlink control information (DCI) to a UE that includes the A-CSI request and an identifier for the downlink BWP of the downlink BWP switching event. After receiving the A-CSI request and the downlink BWP, the UE may perform one or more CSI measurements using the downlink BWP. The UE may use physical uplink shared channel (PUSCH) resources associated with the uplink scheduling DCI to transmit the CSI report to the base station. Using these techniques the base station may be configured to indicate that a downlink BWP switching event is to occur and allocate PUSCH resources to the UE to be used to transmit the CSI report associated with the downlink BWP switching event. In some cases, the techniques described herein may be used for secondary serving cell (SCell) activation events.

A method of wireless communication is described. The method may include receiving uplink scheduling DCI comprising an A-CSI request and an indication of a downlink BWP associated with the A-CSI request, performing a CSI measurement based at least in part on the A-CSI request using the indicated downlink BWP, and transmitting a CSI report based on the CSI measurement to a base station.

An apparatus for wireless communication is described. The apparatus may include means for receiving uplink scheduling DCI comprising an A-CSI request and an indication of a downlink BWP associated with the A-CSI request, means for performing a CSI measurement based at least in part on the A-CSI request using the indicated downlink BWP, and means for transmitting a CSI report based on the CSI measurement to a base station.

Another apparatus for wireless communication is described. The apparatus may include a processor, memory in electronic communication with the processor, and instructions stored in the memory. The instructions may be operable to cause the processor to receive uplink scheduling DCI comprising an A-CSI request and an indication of a downlink BWP associated with the A-CSI, perform a CSI measurement based at least in part on the A-CSI request using the indicated downlink BWP, and transmit a CSI report based on the CSI measurement to a base station.

A non-transitory computer-readable medium for wireless communication is described. The non-transitory computer-readable medium may include instructions operable to cause a processor to receive uplink scheduling DCI comprising an A-CSI request and an indication of a downlink BWP associated with the A-CSI request, perform a CSI measurement based at least in part on the A-CSI request using the indicated downlink BWP, and transmit a CSI report based on the CSI measurement to a base station.

In some examples of the method, apparatus, and non-transitory computer-readable medium described above, the CSI report may be transmitted using a PUSCH or a physical uplink control channel (PUCCH).

In some examples of the method, apparatus, and non-transitory computer-readable medium described above, the method further including processes, features, means, or instructions for receiving a first A-CSI configuration for CSI reporting using the PUSCH and receiving a second A-CSI configuration for CSI reporting using the PUCCH, the first A-CSI configuration being different from the second A-CSI configuration.

In some examples of the method, apparatus, and non-transitory computer-readable medium described above, the uplink scheduling DCI may be a first uplink scheduling DCI and the A-CSI request may be a first A-CSI request, and the method, apparatus, and non-transitory computer-readable medium described above may further include processes, features, means, or instructions for transmitting a second DCI comprising a second A-CSI request and an indication of the downlink BWP, wherein the downlink BWP is associated with both the first A-CSI request and the second A-CSI request.

In some examples of the method, apparatus, and non-transitory computer-readable medium described above, the first uplink scheduling DCI may be associated with CSI reporting using a PUSCH and the second DCI may be associated with CSI reporting using a PUCCH. Some examples of the method, apparatus, and non-transitory computer-readable medium described above may further include processes, features, means, or instructions for detecting a collision between the CSI reporting using the PUSCH and the CSI reporting using the PUCCH. Some examples of the method, apparatus, and non-transitory computer-readable medium described above may further include processes, features, means, or instructions for identifying an error condition based at least in part on the detected collision. Some examples of the method, apparatus, and non-transitory computer-readable medium described above may further include processes, features, means, or instructions for selecting one of the PUSCH or the PUCCH for transmission of the CSI report based at least in part on the detected collision and a set configuration.

Some examples of the method, apparatus, and non-transitory computer-readable medium described above may further include processes, features, means, or instructions for selecting one of the PUSCH or the PUCCH for transmission of the CSI report based at least in part on the detected collision and an order in which the first uplink scheduling DCI and the second DCI are received. Some examples of the method, apparatus, and non-transitory computer-readable medium described above may further include processes, features, means, or instructions for selecting the PUCCH for transmission of a first CSI report on a primary cell and selecting the PUSCH for transmission of a second CSI report on a secondary cell.

Some examples of the method, apparatus, and non-transitory computer-readable medium described above may further include processes, features, means, or instructions for refraining from performing a periodic CSI measurement using the downlink BWP based at least in part on the A-CSI request.

Some examples of the method, apparatus, and non-transitory computer-readable medium described above may further include processes, features, means, or instructions for identifying a value of an A-CSI request field of the uplink scheduling DCI, the uplink scheduling DCI being associated with a paired spectrum. Some examples of the method, apparatus, and non-transitory computer-readable medium described above may further include processes, features, means, or instructions for determining whether a BWP field of the uplink scheduling DCI includes a BWP identifier for the downlink BWP or an uplink BWP based at least in part on identifying the value of the A-CSI request field.

Some examples of the method, apparatus, and non-transitory computer-readable medium described above may further include processes, features, means, or instructions for when the value of the A-CSI request field triggers A-CSI reporting, the BWP identifier may be for the downlink BWP.

Some examples of the method, apparatus, and non-transitory computer-readable medium described above may further include processes, features, means, or instructions for when the value of the A-CSI request field does not trigger A-CSI reporting, the BWP identifier may be for the uplink BWP.

In some examples of the method, apparatus, and non-transitory computer-readable medium described above, the uplink scheduling DCI may be exclusive of an uplink BWP.

Some examples of the method, apparatus, and non-transitory computer-readable medium described above may further include processes, features, means, or instructions for performing a BWP switching event based at least in part on receiving the uplink scheduling DCI that includes the downlink BWP, wherein performing the CSI measurement may be based at least in part on performing the BWP switching event.

Some examples of the method, apparatus, and non-transitory computer-readable medium described above may further include processes, features, means, or instructions for performing a secondary cell activation event based at least in part on receiving the uplink scheduling DCI that includes the one or more component carriers, wherein performing the CSI measurement may be based at least in part on performing the secondary cell activation event.

In some examples of the method, apparatus, and non-transitory computer-readable medium described above, the uplink scheduling DCI includes the A-CSI request, the downlink BWP, and an uplink BWP.

Some examples of the method, apparatus, and non-transitory computer-readable medium described above may further include processes, features, means, or instructions for identifying an index value included in the uplink scheduling DCI, the index value being based at least in part on the downlink BWP and an uplink BWP. Some examples of the method, apparatus, and non-transitory computer-readable medium described above may further include processes, features, means, or instructions for identifying the downlink BWP and the uplink BWP included in the uplink scheduling DCI based at least in part on the index value, wherein performing the CSI measurement is based at least in part on identifying the downlink BWP.

In some examples of the method, apparatus, and non-transitory computer-readable medium described above, the downlink BWP includes a dynamically-configured number of contiguous physical resource blocks at a dynamically-configured frequency location in a radio frequency spectrum band.

A method of wireless communication is described. The method may include identifying an occurrence of a BWP switching event or a secondary cell activation event associated with a UE, identifying an A-CSI request and an indication of a downlink bandwidth part associated with the A-CSI request based at least in part on identifying the occurrence, and transmitting uplink scheduling DCI to the UE that includes the A-CSI request and the indication of the downlink BWP.

An apparatus for wireless communication is described. The apparatus may include means for identifying an occurrence of a BWP switching event or a secondary cell activation event associated with a UE, means for identifying an A-CSI request and an indication of a downlink bandwidth part associated with the A-CSI request based at least in part on identifying the occurrence, and means for transmitting uplink scheduling DCI to the UE that includes the A-CSI request and the indication of the downlink BWP.

Another apparatus for wireless communication is described. The apparatus may include a processor, memory in electronic communication with the processor, and instructions stored in the memory. The instructions may be operable to cause the processor to identify an occurrence of a BWP switching event or a secondary cell activation event associated with a UE, identify an A-CSI request and an indication of a downlink bandwidth part associated with the A-CSI request based at least in part on identifying the occurrence, and transmit uplink scheduling DCI to the UE that includes the A-CSI request and the indication of the downlink BWP.

A non-transitory computer-readable medium for wireless communication is described. The non-transitory computer-readable medium may include instructions operable to cause a processor to identify an occurrence of a BWP switching event or a secondary cell activation event associated with a UE, identify an A-CSI request and an indication of a downlink bandwidth part associated with the A-CSI request based at least in part on identifying the occurrence, and transmit uplink scheduling DCI to the UE that includes the A-CSI request and the indication of the downlink BWP.

Some examples of the method, apparatus, and non-transitory computer-readable medium described above may further include processes, features, means, or instructions for receiving a CSI report using a PUSCH or a PUCCH from the UE based at least in part transmitting the uplink scheduling DCI.

Some examples of the method, apparatus, and non-transitory computer-readable medium described above may further include processes, features, means, or instructions for transmitting a first A-CSI configuration for CSI reporting using the PUSCH, and transmitting a second A-CSI configuration for CSI reporting using the PUCCH, where the first A-CSI configuration is different from the second A-CSI configuration.

In some examples of the method, apparatus, and non-transitory computer-readable medium described above, the uplink scheduling DCI includes a first uplink scheduling DCI and the A-CSI request includes a first A-CSI request, the method further including processes, features, means, or instructions for transmitting a second uplink scheduling DCI including a second A-CSI request and an indication of the downlink BWP, where the downlink BWP may be associated with both the first A-CSI request and the second A-CSI request.

In some examples of the method, apparatus, and non-transitory computer-readable medium described above, the first uplink scheduling DCI is associated with CSI reporting using a PUSCH, the second DCI is associated with CSI reporting using a PUCCH, and a collision exists between the CSI reporting using the PUSCH and the CSI reporting using the PUCCH.

Some examples of the method, apparatus, and non-transitory computer-readable medium described above may further include processes, features, means, or instructions for identifying an error condition based at least in part on the collision.

Some examples of the method, apparatus, and non-transitory computer-readable medium described above may further include processes, features, means, or instructions for selecting one of the PUSCH or the PUCCH for receiving the CSI report based at least in part on the collision and a set configuration.

Some examples of the method, apparatus, and non-transitory computer-readable medium described above may further include processes, features, means, or instructions for selecting one of the PUSCH or the PUCCH to receive the CSI report based at least in part on the collision and an order in which the first uplink scheduling DCI and the second DCI are transmitted.

Some examples of the method, apparatus, and non-transitory computer-readable medium described above may further include processes, features, means, or instructions for receiving the CSI report using the PUCCH on a primary cell and receiving the CSI report using the PUSCH on a secondary cell.

Some examples of the method, apparatus, and non-transitory computer-readable medium described above may further include processes, features, means, or instructions for determining a value of an A-CSI request field of the uplink scheduling DCI, the uplink scheduling DCI being associated with a paired spectrum. Some examples of the method, apparatus, and non-transitory computer-readable medium described above may further include processes, features, means, or instructions for determining whether a BWP field of the uplink scheduling DCI includes a BWP identifier for the downlink BWP or an uplink BWP based at least in part on determining the value of the A-CSI request field.

In some examples of the method, apparatus, and non-transitory computer-readable medium described above, when the value of the A-CSI request field triggers A-CSI reporting, the BWP identifier may be for the downlink BWP.

In some examples of the method, apparatus, and non-transitory computer-readable medium described above, when the value of the A-CSI request field does not trigger A-CSI reporting, the BWP identifier may be for the uplink BWP.

In some examples of the method, apparatus, and non-transitory computer-readable medium described above, the DCI includes an indication of one or more component carriers associated with the A-CSI request. In some examples of the method, apparatus, and non-transitory computer-readable medium described above, the uplink scheduling DCI may be exclusive of an uplink BWP.

In some examples of the method, apparatus, and non-transitory computer-readable medium described above, the uplink scheduling DCI includes the A-CSI request, the downlink BWP, and an uplink BWP.

Some examples of the method, apparatus, and non-transitory computer-readable medium described above may further include processes, features, means, or instructions for mapping the downlink BWP and the uplink BWP to an index value, wherein the uplink scheduling DCI includes the index value.

In some examples of the method, apparatus, and non-transitory computer-readable medium described above, the downlink BWP includes a dynamically-configured number of contiguous physical resource blocks at a dynamically-configured frequency location in a radio frequency spectrum band.

DETAILED DESCRIPTION

Some wireless communications systems may communicate using a bandwidth part (BWP). When communicating using a BWP, the wireless communications system may need to modify the active BWP being used. To perform such a BWP switching event, a wireless device, such as a base station, may need to have information about the channel conditions of the new BWP. To obtain such channel conditions, the base station may send a request for an aperiodic channel state information (A-CSI) report. In some cases, the base station may not support an efficient signaling procedure to communicate the request for a downlink switching event and the A-CSI request in paired spectrum.

Techniques are described herein for signaling a downlink BWP switching event and an A-CSI request. In some cases, in a paired spectrum environment, the base station may transmit uplink scheduling downlink control information (DCI) to a user equipment (UE) that includes the A-CSI request and an identifier for the downlink BWP of the downlink BWP switching event. After receiving the A-CSI request and the downlink BWP, the UE may perform one or more CSI measurements using the downlink BWP. The UE may use physical uplink shared channel (PUSCH) resources associated with the uplink scheduling DCI or physical uplink control channel (PUCCH) resources associated with the uplink scheduling DCI to transmit the CSI report to the base station. Using these techniques, the base station may be configured to indicate that a downlink BWP switching event is to occur and allocate PUSCH resources or PUCCH resources to the UE to be used to transmit the CSI report associated with the downlink BWP switching event. In some cases, the techniques described herein may be used for secondary serving cell (SCell) activation events.

Aspects of the disclosure are initially described in the context of a wireless communications system. Aspects of the disclosure are further described in the context of message structures and a communication scheme. Aspects of the disclosure are also illustrated by and described with reference to apparatus diagrams, system diagrams, and flowcharts that relate to techniques for signaling a channel state information request and a communication link event.

Figure 1:
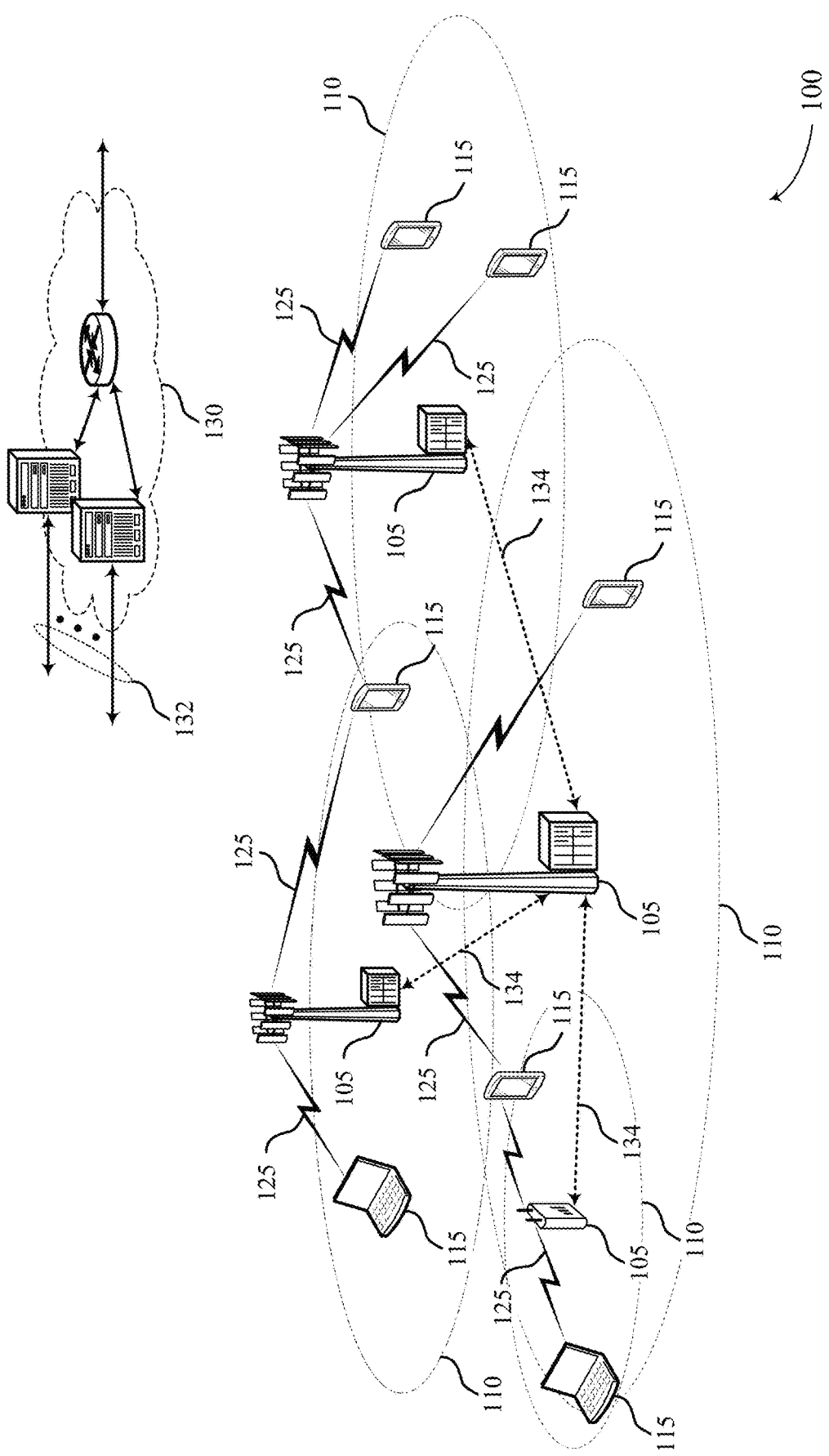
FIG. 1 illustrates an example of a system for wireless communication that supports techniques for signaling a channel state information request and a communication link event in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some cases, one or more of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data so as to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as $T_f$=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Techniques are described herein for signaling a downlink BWP switching event and an A-CSI request in a paired spectrum or an unpaired spectrum environment. The base station may transmit uplink scheduling DCI to a UE that includes the A-CSI request and an identifier for the downlink BWP of the downlink BWP switching event.

In some cases, the UE 115 may receive multiple DCIs (e.g., for uplink scheduling and/or downlink scheduling) that include A-CSI requests for a single A-CSI transmission instance (e.g., slot). In some examples, these DCIs may indicate the same set of CCs or downlink BWP for the same transmission instance. For instance, multiple DCIs triggering A-CSI reporting during the same transmission instance may not indicate different frequency instances (e.g., CCs or downlink BWPs). Further, after receiving the A-CSI request and the downlink BWP, the UE may perform one or more CSI measurements using the downlink BWP. In some cases, the UE may use PUSCH resources or PUCCH resources associated with the uplink scheduling DCI to transmit the CSI report to the base station.

In some cases, if there is a collision between an A-CSI report and a periodic CSI (P-CSI) report on the same component carrier, the P-CSI report may be dropped on that component carrier. P-CSI dropping may occur on an individual component carrier basis, meaning that a UE may drop (or refrain from transmitting) a P-CSI report on one component carrier due to a collision with an A-CSI report, but may transmit a P-CSI report on a different component carrier during the same transmission instance.

In some cases, A-CSI reporting on PUSCH resources may be configured separately from A-CSI reporting on PUCCH resources. For example, a UE may receive a first A-CSI configuration (e.g., in a radio resource control (RRC) layer message) for A-CSI reporting on PUSCH resources and a second A-CSI configuration (e.g., in the same or a different RRC layer message) for A-CSI reporting on PUCCH resources.

In some cases, an error may be returned if the PUCCH resources to be used for transmitting an A-CSI report in a transmission instance collide with the PUSCH resources for transmitting a different A-CSI report in the same transmission instance. Alternatively, either the PUCCH resources or the PUSCH resources may be selected for the A-CSI report based on a set or predefined configuration, or an order in which the different DCIs scheduling the respective A-CSI reports are received by the UE. In some other cases, simultaneous PCell/PSCell PUCCH and SCell PUSCH transmissions may be permitted.

In some aspects, such techniques may allow the base station to be configured to indicate that a downlink BWP switching event is to occur, and allocate PUSCH resources to the UE to be used to transmit the CSI report associated with the downlink BWP switching event. In some cases, the techniques described herein may also be used for SCell activation events.

Figure 2:
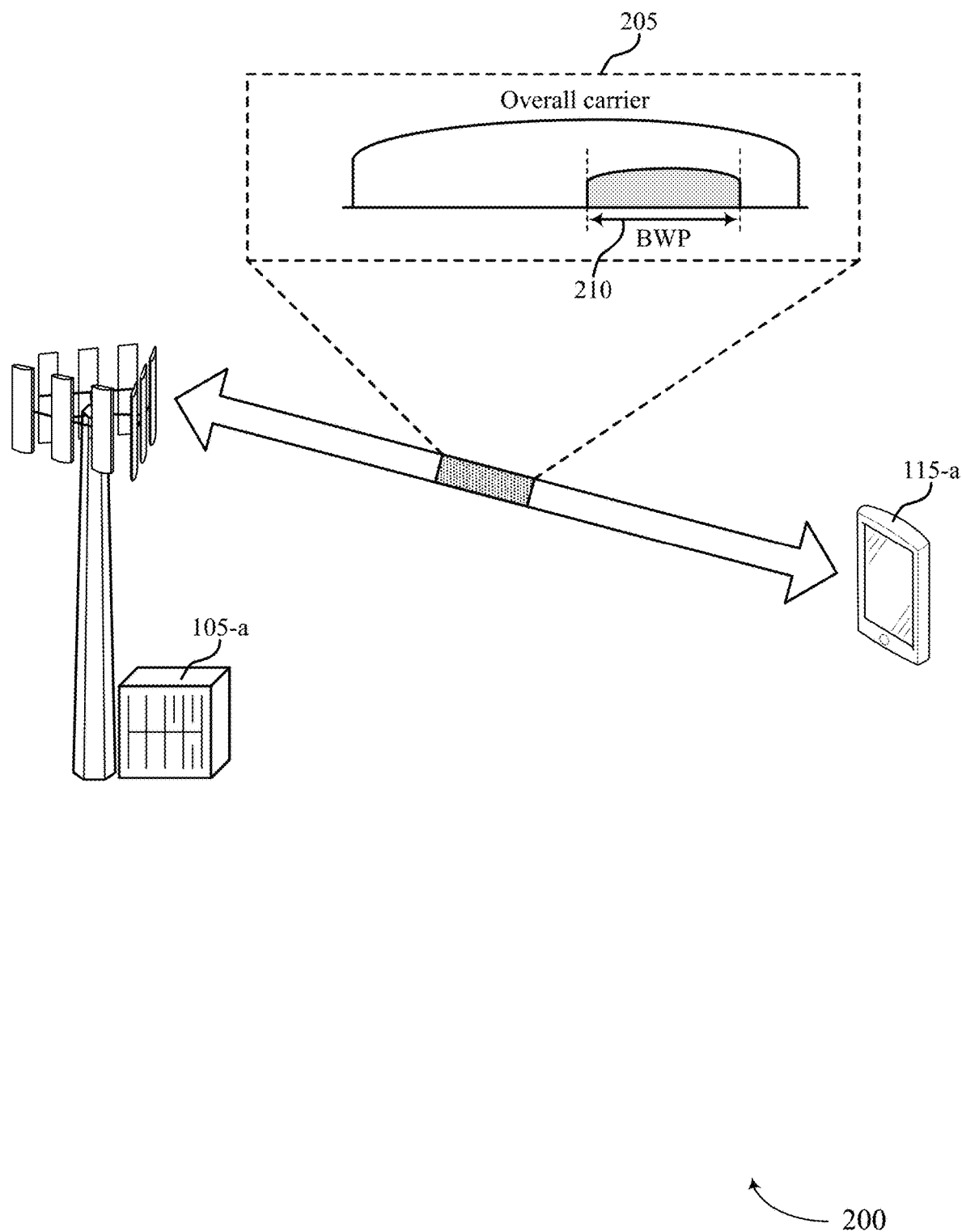
FIG. 2 illustrates an example of a wireless communications system that supports techniques for signaling a channel state information request and a communication link event in accordance with aspects of the present disclosure.

FIG. 2 illustrates an example of a wireless communications system 200 that supports techniques for signaling a channel state information request and a communication link event in accordance with various aspects of the present disclosure. In some examples, the wireless communications system 200 may implement aspects of wireless communications system 100. The wireless communications system 200 may include a base station 105-a and a UE 115-a that may communicate information using a carrier 205. The wireless communications system 200 may be configured to use one or more bandwidth parts (BWPs) 210 for communicating information within the carrier 205.

In some cases, a BWP 210 may comprise a group of contiguous physical resource blocks (PRBs). The bandwidth of the BWP 210 may be equal to or smaller than a maximum bandwidth capability supported by a UE 115-a, or the bandwidth of the carrier 205. In some cases, the bandwidth of the BWP 210 may be at least as large as a bandwidth of a synchronization signal (SS) block.

In some cases, the BWP 210 may be a dynamically-configured (or semi-statically configured) portion of the carrier 205. The BWP 210 may include a number of dynamically (or semi-statically) configurable parameters. Examples of such parameters may include frequency location (e.g., center frequency), bandwidth (e.g., number of PRBs), numerology (e.g., sub-carrier spacing and/or cyclic prefix type), or a combination thereof. The parameters of the BWP 210 may be communicated using DCI, a medium access control (MAC) control element (CE), radio resource control (RRC) signaling, and/or a time pattern (e.g., in a discontinuous reception situation). The granularity of certain parameters may be the size of one PRB (e.g., bandwidth granularity may be 1 PRB and frequency location granularity may be 1 PRB).

In some cases, the BWP 210 may be configured for downlink, uplink, or both. BWPs 210 may be configured independently for each cell (e.g., primary cells and/or secondary cells). In such cases, if an SCell is deactivated, the BWPs of that cell may also be deactivated. In some cases, the UE 115-a may be configured to simultaneously communicate using one or more downlink BWPs and/or one or more uplink BWPs. In some cases, there is at most one active downlink BWP and at most one active uplink BWP at a given time for a serving cell. A primary serving cell (PCell) may be the cell that handles the RRC connection between the UE 115-a and the base station 105-a, and an SCell may be any other serving cells established between the UE 115-a and the base station 105-a.

BWPs 210 may be used in both paired spectrum and unpaired spectrum. In paired spectrum, a first frequency spectrum band may be allocated (e.g., dedicated) for downlink communications and a second frequency spectrum band may be allocated (e.g., dedicated) for uplink communications. Paired spectrum may use FDD systems to establish two-way communications between nodes. In unpaired spectrum, the same frequency spectrum band may be used for both uplink and downlink communications. Unpaired spectrum may use TDD systems to establish two-way communications between nodes. In some cases, for paired spectrum, a maximum number of BWP configurations may be four downlink BWPs and four uplink BWPs. In some cases, for unpaired spectrum, a maximum number of BWP configurations may be four downlink/uplink BWP pairs. In some cases, for FDD, the BWPs for downlink and the BWPs for uplink may be configured independently on a per-component carrier (CC) basis. In some cases, for TDD, a joint set of downlink BWPs and uplink BWPs may be configured on a per-CC basis.

In some cases, an active BWP 210 of the UE 115-a may not span a frequency spectrum band larger than a bandwidth of a CC of the UE 115-a. The configuration for a downlink BWP may include at least one control resource set (CORESET). In some cases, at least one configured downlink BWP may include a CORESET with a common search space (C-SS) in a primary component carrier (PCC). In some cases, in a PCell, for the UE 115-a, a C-SS may be configured in each BWP 210. In some cases, each configured downlink BWP, for the case of single active BWP at a given time, may include at least one CORESET with a UE-specific search space (UE-SS). In some cases, if the active downlink BWP does not include a C-SS, the UE 115-a may not monitor the C-SS.

Upon establishing an RRC connection, the UE 115-a or the base station 105-a may activate a default configuration of one or more BWPs 210 (e.g., a downlink BWP and an uplink BWP). The UE 115-a and the base station 105-a may use those default BWPs 210 until the BWPs 210 are explicitly configured or reconfigured.

The wireless communications system 200 may also support a BWP switching event. As part of a BWP switching event, the UE 115-a (or the base station 105-a) may switch the active BWP to another BWP within a given serving cell. A BWP switching event may signaled using DCI. In some cases, such as for FDD, a downlink BWP 210 may be switched using a downlink scheduling DCI and an uplink BWP 210 may be switched using an uplink scheduling DCI. In some other cases, such as for TDD, either downlink BWPs or uplink BWPs may be switched using either the downlink DCI or uplink DCI. In some cases, the wireless communications system 200 may support a timer for timer-based active BWP switching. In such a time-based configuration, the BWP 210 may switch from an active BWP 210 to a default BWP 210 based on the timer expiring.

In some cases, the UE 115-a and/or the base station 105-a may need updated channel state information (CSI) to establish a new BWP. In other cases, however, the UE 115-a and/or the base station 105-a may be configured to leverage prior CSI reports to establish a new BWP 210.

Figure 3:
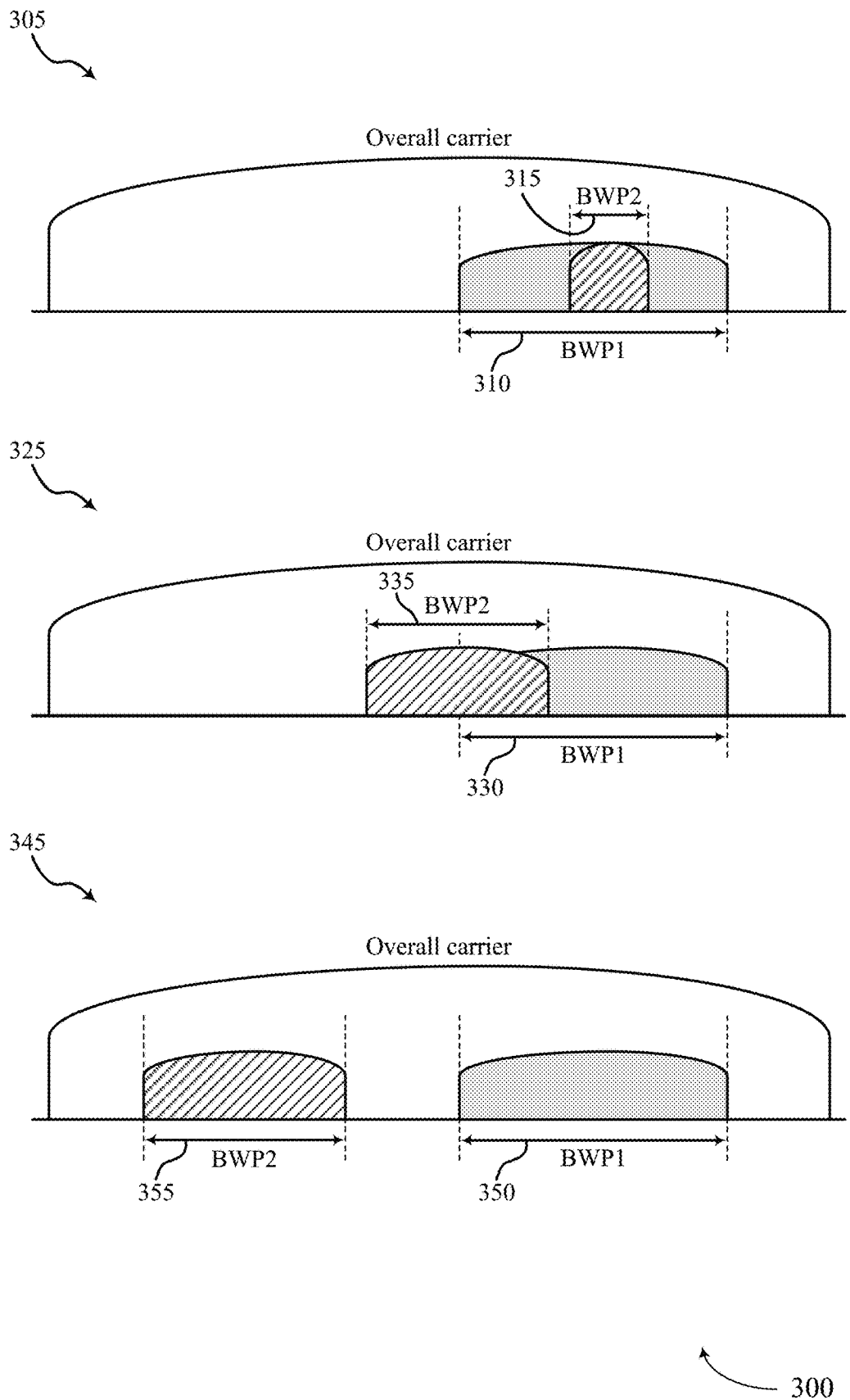
FIG. 3 illustrates examples of bandwidth part switching events that support techniques for signaling a channel state information request and a communication link event in accordance with aspects of the present disclosure.

FIG. 3 illustrates examples of BWP switching events 300 that support techniques for signaling a channel state information request and a communication link event in accordance with various aspects of the present disclosure. In some examples, the BWP switching events 300 may implement aspects of the wireless communications systems 100 and 200. The BWP switching events 300 illustrates some, but not all, examples of types of BWP switching events that may occur in a wireless communications system.

In a first example, a first BWP switching event 305 shows a switching event where the active BWP is switched from a current BWP 310 (e.g., BWP1) to a new BWP 315 (e.g., BWP2). In the first BWP switching event 305, the new BWP 315 may be a subset of the current BWP 310. In some cases, the new BWP 315 may be established based on CSI measurements from the current BWP 310 (i.e., because the CSI measurements from the current BWP 310 include the PRBs of the new BWP 315). In other cases, however, a new CSI measurement may be requested at the first BWP switching event 305 because the previous CSI measurements may be outdated.

In a second example, a second BWP switching event 325 illustrates a switching event where the active BWP is switched from a current BWP 330 (e.g., BWP1) to a new BWP 335 (e.g., BWP2). In the second BWP switching event 325, the new BWP 335 may at least partially overlap with the current BWP 330. In some cases, the new BWP 335 may be established using CSI measurements from the current BWP 330 based on the amount of overlap between the two BWPs. In other cases, however, the amount of overlap may be low enough that updated CSI measurements may be required to establish the new BWP 335. As such, a new CSI measurement may be requested at the second BWP switching event 325 because the previous CSI measurements may be outdated or irrelevant to the resources of the new BWP 335.

In a third example, a third BWP switching event 345 illustrates a switching event where the active BWP is switched from a current BWP 350 (e.g., BWP1) to a new BWP 355 (e.g., BWP2). In the third BWP switching event 345, the new BWP 355 may include PRBs that are mutually exclusive from the PRBs of the current BWP 350. In these cases, the CSI measurements associated with the current BWP 350 may not be relevant to the new BWP 355 because the CSI measurements are of different PRBs. As such, a new CSI measurement may be requested at the third BWP switching event 345 because the previous CSI measurements may be irrelevant to the resources of the new BWP 355.

CSI reporting and CSI measurements may be used to determine and/or indicate channel conditions associated with specified communication resources. Channel conditions may change as a UE 115 moves through a coverage area or channel conditions may change as the UE 115 uses new communication resources (e.g., a BWP switching event). In some cases, the wireless communications system 200 of FIG. 2 may use CSI (e.g., channel conditions) to establish BWPs 210. CSI reports may be periodic or aperiodic. An aperiodic CSI, sometimes referred to as an A-CSI report may be an example of a CSI report generated not based on a periodic CSI calculator. A CSI measurement may be any measurement performed based on a CSI request regardless of whether the request is for a periodic CSI report or an A-CSI report. In some examples, the UE 115 may drop periodic CSI reporting for a BWP 210 or a component carrier which is scheduled for A-CSI reporting. For example, if DCI requests A-CSI reporting on a BWP or component carrier which was scheduled for P-CSI reporting, UE 115 may perform the A-CSI reporting for the BWP 210 and refrain from performing the P-CSI reporting.

DCI may be used to request an A-CSI report. For example, DCI may include one or more bits to indicate whether an A-CSI report is requested and, in some cases, for what cells or BWPs the A-CSI is requested. In some aspects, the DCI may also be configured to indicate a BWP switching event. In such cases, the DCI may include a BWP identifier identifying the new BWP that is to be implemented by the UE 115. For example, in uplink, an uplink scheduling DCI may include a CSI request (e.g., periodic or aperiodic) and a BWP identifier for an uplink BWP and a downlink scheduling DCI may include a CSI request (e.g., periodic or aperiodic) and a BWP identifier for a downlink BWP.

In some cases, the UE 115 may receive multiple DCIs requesting A-CSI reporting for a BWP 210. That is, the UE 115-a may receive the same A-CSI value (e.g., the same one or more bits) for a given A-CSI reporting occasion from multiple DCIs. For example, the UE 115 may receive DCI including downlink or uplink grants from multiple time instances (e.g., slots) and frequency instances (e.g., component carriers or BWPs 210). The DCI may be transmitted on resources with the same or different subcarrier spacing. In some cases, the same set of component carriers or BWPs 210 may be triggered for CSI feedback from each of the triggers. In some cases, each received DCI may initiate A-CSI reporting for the same BWP 210. In some cases, a configuration for the A-CSI reporting occasion indicated in a first DCI may be changed by a subsequent DCI.

In some cases, including an A-CSI request in the downlink scheduling DCI may trigger communicating the A-CSI report using a physical uplink control channel (PUCCH). In addition, in some cases, including an A-CSI request in the uplink scheduling DCI may trigger communicating the A-CSI report using a PUSCH. In some cases, uplink scheduling DCI may include different configurations for reporting A-CSI on PUCCH and reporting A-CSI on PUSCH. For example, a UE 115 may report wideband CQI on PUCCH and report subband CQI on PUSCH. The configurations for PUCCH and PUSCH reporting may be semi-statically configured, for example by RRC signaling or a higher layer.

In some cases, a UE 115 (e.g., UE 115-a) may receive multiple DCIs (e.g., as described above), where a first DCI may request A-CSI reporting on PUSCH resources and a second DCI may request A-CSI reporting on PUCCH resources. In some cases, the UE 115-a may determine there is an error based on being requested to transmit the CSI report on both channels. In such cases, the UE 115-a may discard the A-CSI requests if an error is detected. In some cases, UE 115-a may transmit an indication of the error to the serving base station 105. In some other examples, UE 115-a may select a channel to use based on a set configuration (e.g., a predefined channel). For example, when requested to report using PUCCH and PUSCH, UE 115-a may report the A-CSI on PUSCH or transmit the A-CSI report on PUSCH. In some cases, the configuration may be set by RRC signaling.

In some examples, the UE 115-a may determine to report CSI using PUSCH or PUCCH (i.e., based on whichever channel was indicated in the most recently received DCI). For example, if UE 115-a receives a first DCI requesting to report A-CSI using PUSCH, and UE 115-a receives a second DCI in a following slot requesting UE 115-a to report A-CSI on PUCCH, UE 115-a may report A-CSI using PUCCH.

In some cases, UE 115-a may simultaneously report A-CSI on PUSCH and PUCCH. For example, UE 115-a may report A-CSI using PUCCH on a PCell or a PSCell and report A-CSI using PUSCH on an SCell. In some cases, UE 115-a may transmit a first A-CSI report on the PUCCH resources and a second A-CSI report on the PUSCH resources. In some cases, the first A-CSI report and the second A-CSI report may be the same or may include the same measurements.

Techniques are described herein for signaling a downlink BWP switching event and an A-CSI request in a paired spectrum environment. After receiving the A-CSI request and the downlink BWP, a UE 115-a may transmit a CSI report using PUSCH. In some cases, uplink scheduling DCI may be used to communicate the A-CSI request and the BWP identifier. The UE 115-a may perform one or more CSI measurements using the BWP identifier. The PUSCH resources associated with the uplink scheduling DCI may be used to transmit the CSI report. In other cases, the downlink BWP may be communicated using a downlink scheduling DCI and the A-CSI request may be communicated using the uplink scheduling DCI.

In some cases, the techniques described herein may be used in conjunction with activating a SCell. In such cases, a cell activation event and an A-CSI request may be communicated to a UE 115-a operating in a paired or unpaired spectrum. The signaling may include a cell identifier of the SCell to be activated. In some cases, uplink scheduling DCI may be used to communicate the A-CSI request and the cell identifier. The UE 115-a may perform one or more CSI measurements using the cell identifier. The PUSCH resources associated with the uplink scheduling DCI may be used to transmit the CSI report. In other cases, the cell identifier may be communicated using a downlink scheduling DCI and the A-CSI request may be communicated using the uplink scheduling DCI.

Figure 4:
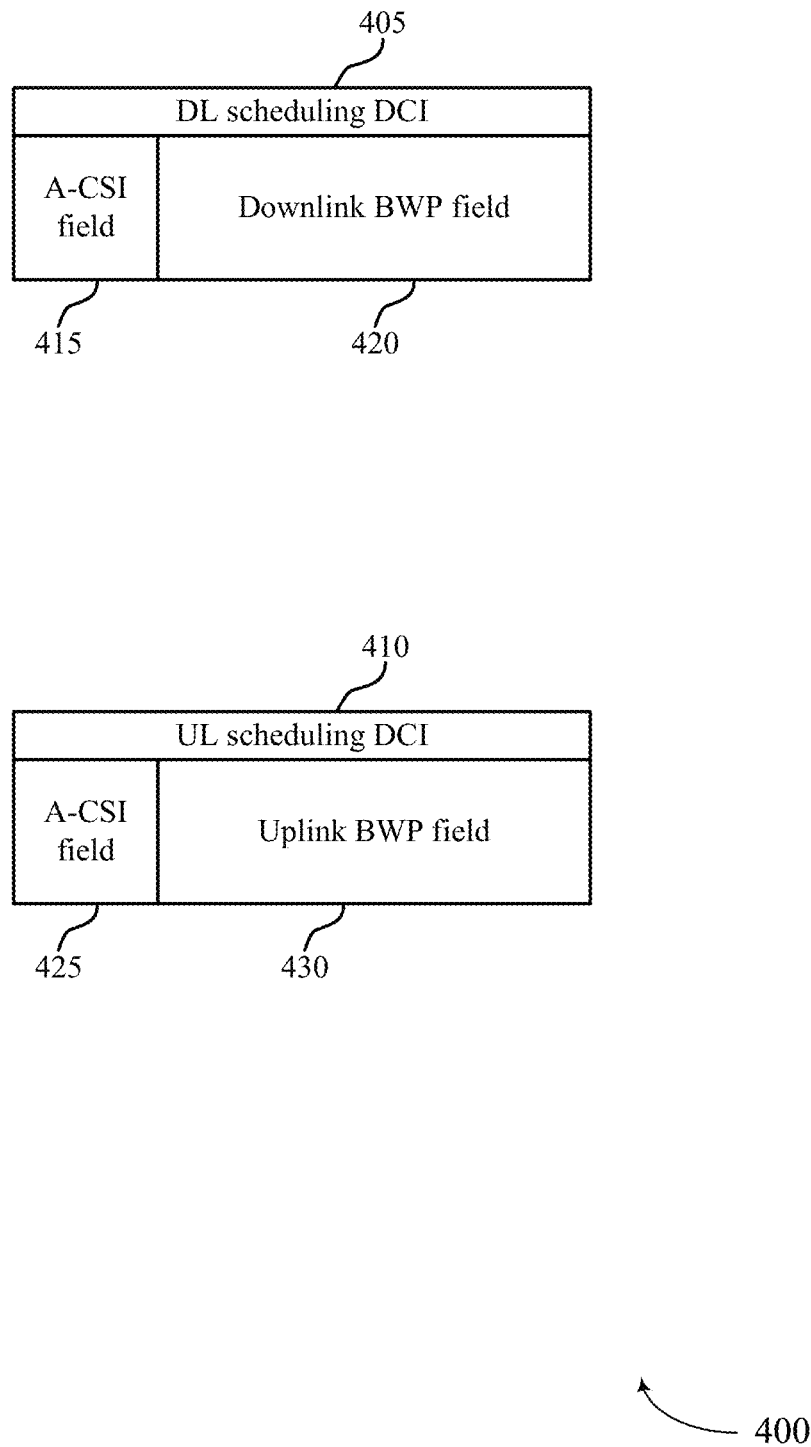
FIG. 4 illustrates examples of message structures that support signaling a channel state information request and a communication link event in accordance with aspects of the present disclosure.

FIG. 4 illustrates examples of message structures 400 that support techniques for signaling a channel state information request and a communication link event in accordance with various aspects of the present disclosure. In some examples, the message structures 400 may implement aspects of the wireless communications systems 100 and 200. The message structures 400 illustrate an example of a technique for causing a CSI report to be transmitted on PUSCH for a downlink BWP switching event (or cell activation event) in paired spectrum. The message structures 400 include downlink scheduling DCI 405 and uplink scheduling DCI 410.

In this example, the indication of the downlink BWP switching event and the identifier for the downlink BWP may be included in the downlink scheduling DCI 405 and the resources for transmitting a CSI report may be indicated using the uplink scheduling DCI 410. In such examples, the combination of both the downlink scheduling DCI 405 and the uplink scheduling DCI 410 may be used to execute the BWP switching event (or the cell activation event, as the case may be). In such examples, the A-CSI request may be included in either the downlink scheduling DCI 405, the uplink scheduling DCI 410, or both.

The downlink scheduling DCI 405 may include an A-CSI field 415 and a downlink BWP field 420. The A-CSI field 415 may be configured to indicate an A-CSI request. Based on a value (e.g., a logic state) of the one or more bits of the A-CSI field 415, the UE 115-a may determine whether an A-CSI is requested by the base station 105-a. The downlink BWP field 420 may be configured to indicate a BWP identifier for a downlink BWP. In some cases, the downlink BWP in the downlink BWP field 420 may be associated with the A-CSI request in the A-CSI field 415.

The uplink scheduling DCI 410 may include an A-CSI field 425 and an uplink BWP field 430. The A-CSI field 425 may be configured to indicate an A-CSI request. Based on a value (e.g., a logic state) of the one or more bits of the A-CSI field 425, the UE 115-a may determine whether an A-CSI is requested by the base station 105-a. The uplink BWP field 430 may be configured to indicate a BWP identifier for an uplink BWP. In some cases, the uplink BWP in the uplink BWP field 430 may be associated with the A-CSI request in the A-CSI field 425.

In some cases, if the UE 115-a receives the downlink scheduling DCI that includes an A-CSI request and a downlink BWP, the UE 115-a may transmit the associated CSI report using PUCCH. In some cases, the UE 115-a may be configured to transmit the CSI report associated with the downlink BWP switching event using the PUSCH resources associated with the uplink scheduling DCI 410 when both DCI 405 and DCI 410 include an A-CSI request. For example, if both DCIs 405, 410 include an A-CSI request, the UE 115-a may determine that the CSI report associated with the downlink BWP is to be transmitted using PUSCH.

The example of the message structures 400 may be an inefficient use of downlink control resources. For example, to signal a downlink BWP switching event and to get the CSI report, both the downlink scheduling DCI 405 and uplink scheduling DCI 410 may need to be communicated. In addition, in some cases, the combination of the DCIs 405, 410 may include redundant and/or unnecessary information. For example, communicating two separate CSI fields may be redundant and communicating the uplink BWP may be unnecessary. Other techniques may be used to address some or all of these issues.

Figure 5:
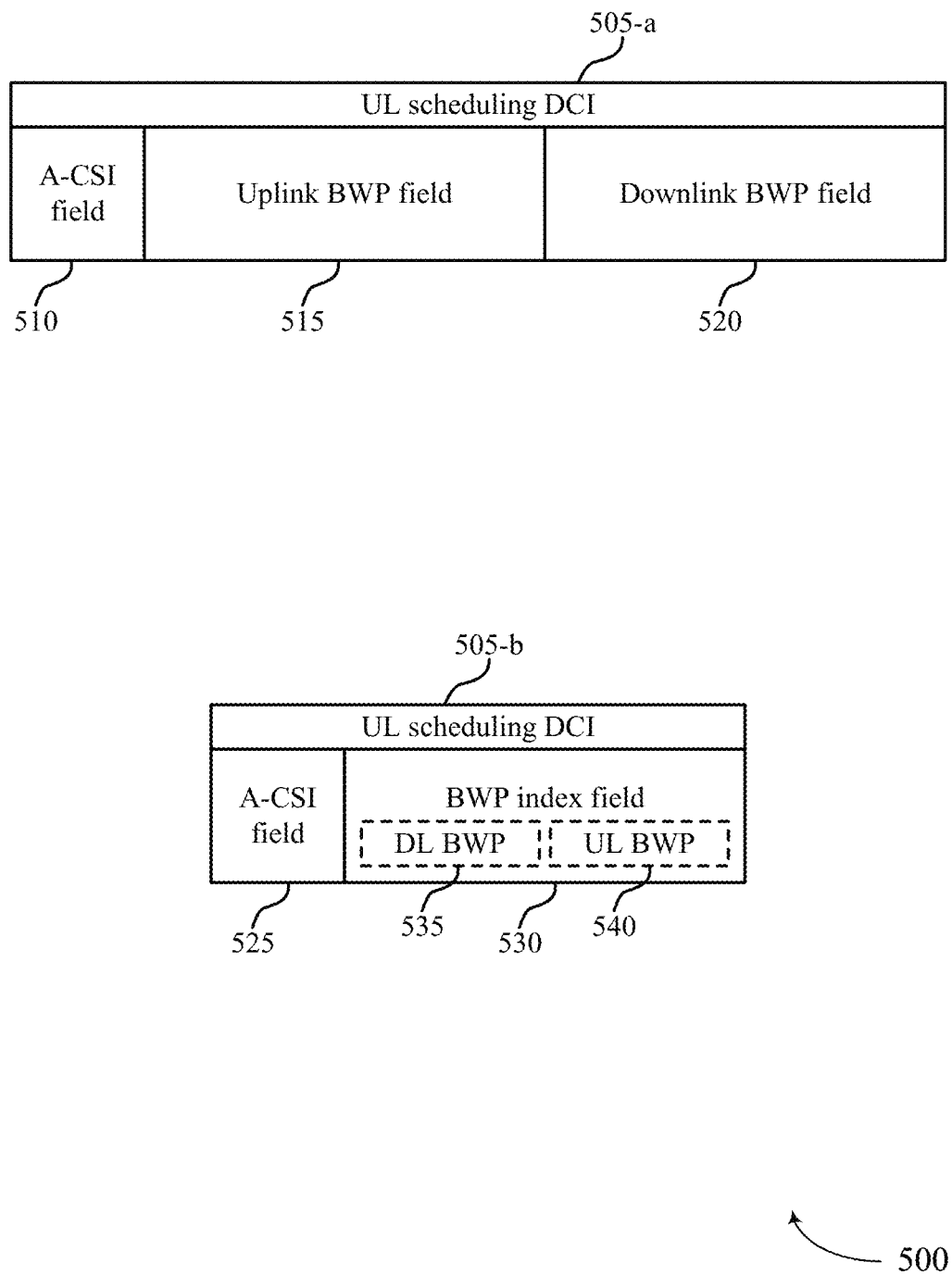
FIG. 5 illustrates examples of message structures that support signaling a channel state information request and a communication link event in accordance with aspects of the present disclosure.

FIG. 5 illustrates examples of message structures 500 that support techniques for signaling a channel state information request and a communication link event in accordance with various aspects of the present disclosure. In some examples, the message structures 500 may implement aspects of the wireless communications systems 100 and 200. The message structures 500 illustrate an example of a technique for causing a CSI report to be transmitted on PUSCH for a downlink BWP switching event (or cell activation event) in paired spectrum. The message structures 500 represent structures where a downlink BWP and an uplink BWP are indicated in uplink scheduling DCI 505.

A first uplink scheduling DCI 505-a may include an A-CSI field 510, an uplink BWP field 515, and a downlink BWP field 510. The A-CSI field 510 may be configured to communicate a request for a CSI report (e.g., an A-CSI report) and may be an example of the A-CSI fields 415, 425 described with reference to FIG. 4. The BWP fields 515, 520 may be configured to communicate indicators for an uplink BWP and a downlink BWP, respectively. The BWP fields 515, 520 may be examples of the BWP fields 420, 430 described with reference to FIG. 4.

The first uplink scheduling DCI 505-a may include a greater number of bits than other uplink scheduling DCIs (e.g., the second uplink scheduling DCI 505-b or the uplink scheduling DCI 410). Having a larger DCI size or having two or more different sizes for uplink scheduling DCIs may impact blind decoding. For example, a UE 115-a may have to identify the DCI size prior to decoding.

The second uplink scheduling DCI 505-b may include an A-CSI field 525 and a BWP index field 530. The A-CSI field 525 may be configured to communicate a request for a CSI report (e.g., an A-CSI report), and may be an example of the A-CSI fields 415, 425 described with reference to FIG. 4. The BWP index field 530 may be configured to communicate an index value associated with both a downlink BWP 535 and an uplink BWP 540. In some cases, to carry more information (e.g., two BWP indicators) using the same number of bits, the base station 105-a may map a first identifier for the downlink BWP 535 and a second identifier for the uplink BWP 540 to a single index value. Such a mapping may be preconfigured and may limit the number of possible BWP configurations that may be communicated using this technique.

Figure 6:
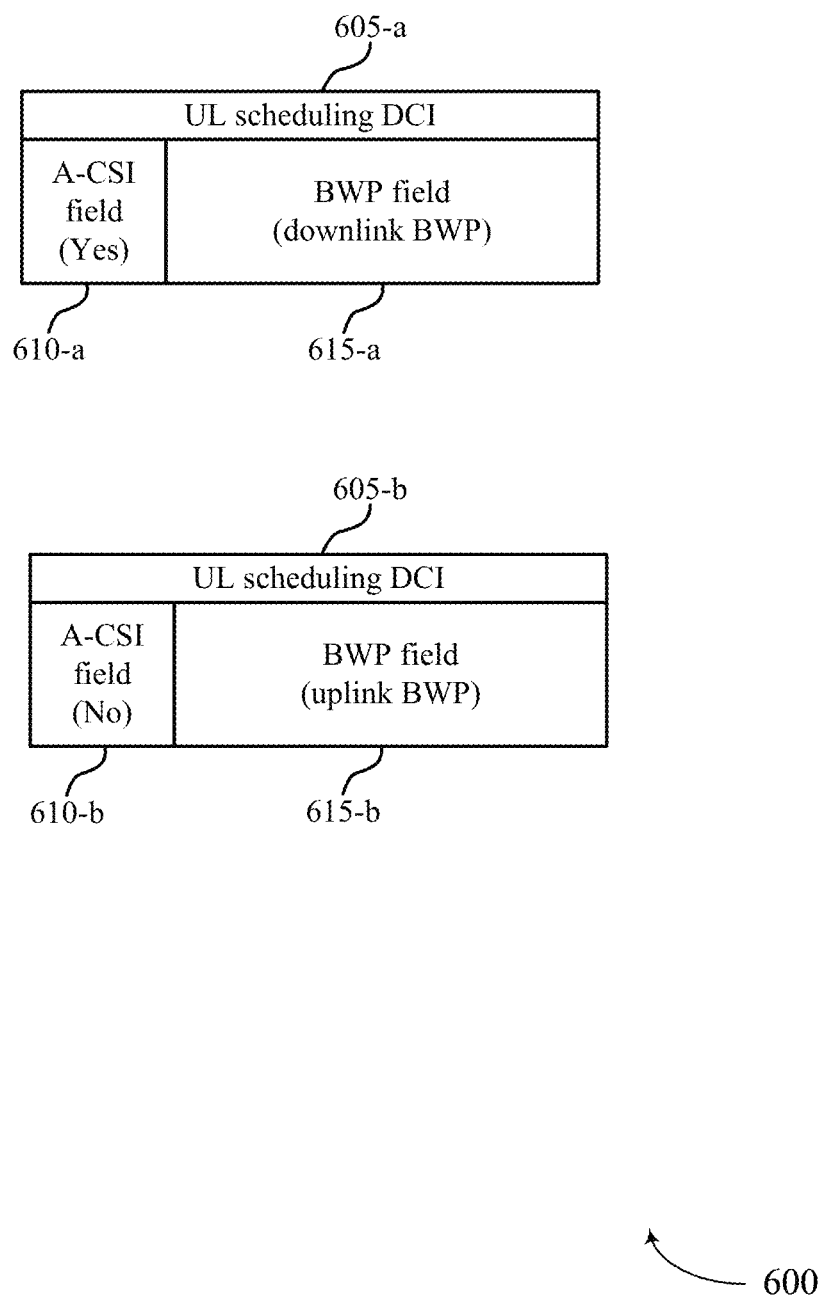
FIG. 6 illustrates examples of message structures that support signaling a channel state information request and a communication link event in accordance with aspects of the present disclosure.

FIG. 6 illustrates examples of message structures 600 that support techniques for signaling a channel state information request and a communication link event in accordance with various aspects of the present disclosure. In some examples, the message structures 600 may implement aspects of the wireless communications systems 100 and 200. The message structures 600 illustrate an example of a technique for causing a CSI report to be transmitted on PUSCH for a downlink BWP switching event (or cell activation event) in paired spectrum. The message structures 600 both represent the same uplink scheduling DCI 605, however, the uplink scheduling DCI 605 may be configured differently based on certain conditions being satisfied.

In some cases, a first uplink scheduling DCI 605-a and a second uplink scheduling DCI 605-b may include an A-CSI field 610 and a BWP field 615. The A-CSI field 510 may be configured to communicate a request for a CSI report (e.g., an A-CSI report) and may be an example of the A-CSI fields 415, 425, 510, 525 described with reference to FIGS. 4 and 5. In some examples, the BWP field 615 may be configured to communicate an identifier for a BWP (i.e., an uplink BWP or a downlink BWP) based on satisfying certain conditions.

The BWP fields 615 may be examples of the BWP fields 420, 430, 515, 520, as described with reference to FIGS. 4 and 5.

In some cases, the content of the BWP field 615 may be configurable based on the content of the A-CSI field 610. For example, in the first uplink scheduling DCI 605-a, if the A-CSI field 610-a indicates that a CSI report is being requested, the BWP field 615-a may include an identifier for a downlink BWP. In the second uplink scheduling DCI 605-b, if the A-CSI field 610-b indicates that a CSI report is not being requested, the BWP field 615-b may include an identifier for an uplink BWP. In this manner, the same uplink scheduling DCI 605 may be used for multiple purposes. If an A-CSI is being requested, the uplink scheduling DCI 605 may be used to signal a downlink BWP switching event. As such, the BWP field 615 may include an identifier for a downlink BWP and a CSI report associated with the downlink BWP switching event may be communicated using the PUSCH resources associated with the uplink scheduling DCI 605. If an A-CSI is not being requested, the uplink scheduling DCI 605 may be used for uplink BWP purposes (e.g., an uplink BWP switching event). As such, the BWP field 615 may include an identifier for an uplink BWP.

Figure 7:
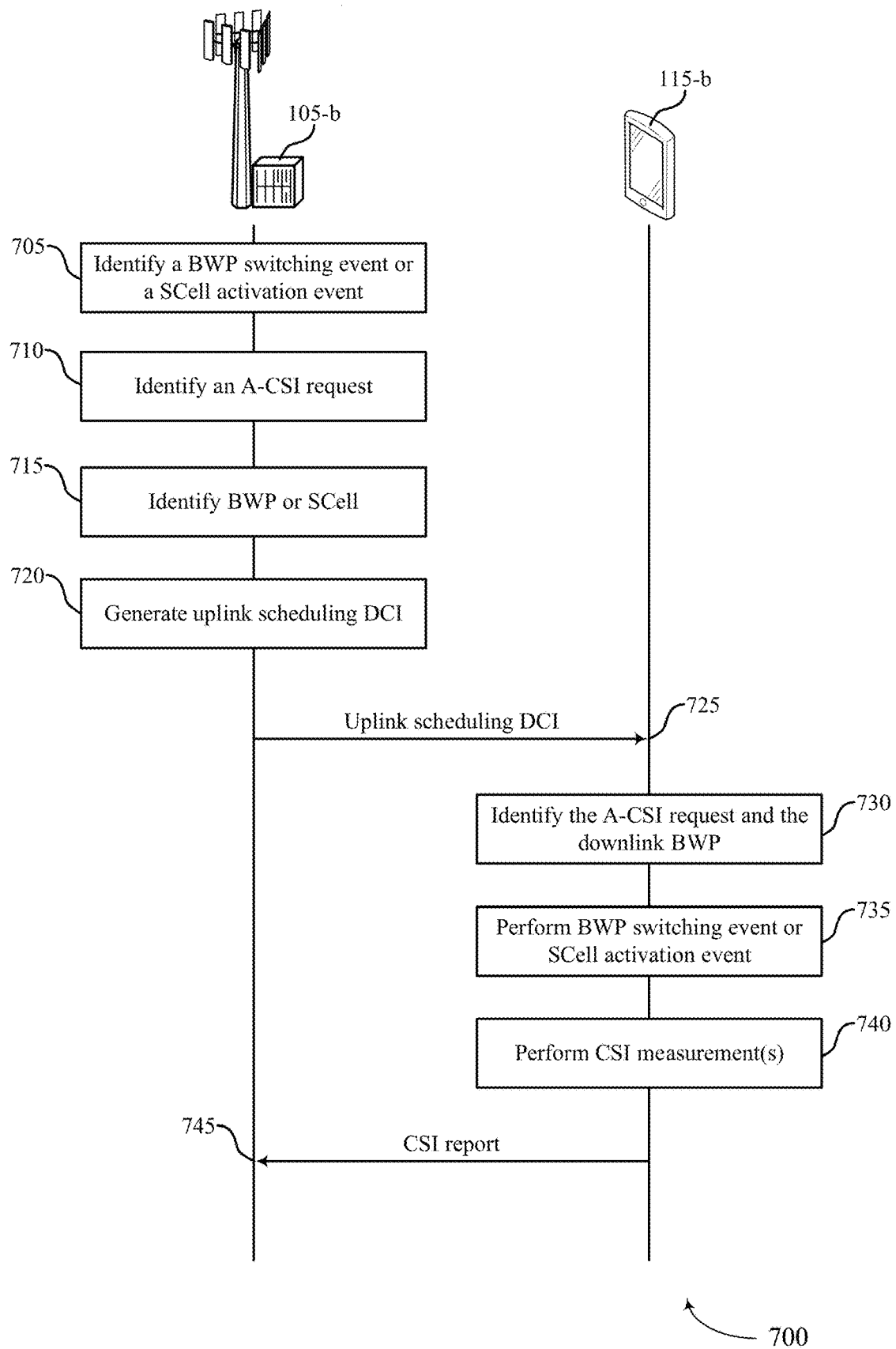
FIG. 7 illustrates an example of a communication scheme that supports techniques for signaling a channel state information request and a communication link event in accordance with aspects of the present disclosure.

FIG. 7 illustrates an example of a communication scheme 700 that supports techniques for signaling a channel state information request and a communication link event in accordance with various aspects of the present disclosure. In some examples, the communication scheme 700 may implement aspects of the wireless communications systems 100 and 200. The communication scheme 700 may illustrate techniques for causing a CSI report to be transmitted on PUSCH for a downlink BWP switching event (or cell activation event). The communication scheme 700 may include functions and/or communications between a base station 105-b and a UE 115-b. The communication scheme 700 may be used in connection with any of the message structures described with reference to FIGS. 4-6. The communication scheme may apply to both paired spectrum or unpaired spectrum unless specifically noted otherwise.

At 705, the base station 105-b may identify a BWP switching event or a SCell activation event. In either case, the base station 105-b may use the techniques described herein to perform either event. A BWP switching event may include changing an active BWP (downlink or uplink) from a current BWP to a new BWP. In some cases, a SCell activation may include activating a secondary servicing cell. In both events, downlink control information may be used to signal an A-CSI request and/or identifier related to the event (e.g., BWP identifier(s) or SCell identifier(s)). In some cases, the base station 105-b may determine that a downlink BWP switching event is to occur and that an updated CSI report is needed to perform the downlink BWP switching event.

At 710, the base station 105-b may identify a request for performing an A-CSI measurement and providing an A-CSI report. In some cases, to switch a BWP or to activate an SCell channel, conditions regarding the new channel resources may be needed to fully establish the new BWP and/or the new SCell. The base station 105-b may determine whether updated CSI (e.g., information about channel conditions) is needed. In some aspects, CSI may include a channel quality indicator (CQI), a precoding matrix indicator (PMI), a precoding type indicator (PTI), a rank indication (RI), or a combination thereof. In some cases, CSI may also include other measurements of channel conditions, such as received signal strength indicator (RSSI), reference signal received power (RSRP), reference signal received quality (RSRQ), or a combination thereof.

At 715, the base station 105-b may identify a new BWP or a SCell associated with the BWP switching event or the SCell activation event. In the case of a downlink BWP switching event, the base station 105-b may identify a new downlink BWP. The new downlink BWP may be configured to replace a current downlink BWP. In the case of an SCell activation event, the base station 105-b may identify a new SCell to activate.

At 720, the base station 105-b may generate uplink scheduling DCI 725 based on the occurrence of the BWP switching event or the occurrence of an SCell activation event. The uplink scheduling DCI 725 may include an A-CSI request. In some cases, such as during a downlink BWP switching event in paired spectrum, the uplink scheduling DCI 725 may include an identifier for the new downlink BWP (e.g., uplink scheduling DCI 605-a described with reference to FIG. 6). In some cases, the presence of an A-CSI request and/or the presence of a downlink BWP in the uplink scheduling DCI 725 may indicate to the UE 115-b that the uplink scheduling DCI 725 is associated with a downlink BWP switching event.

In some cases of a downlink BWP switching event in paired spectrum, the uplink scheduling DCI 725 may include an identifier for an uplink BWP and an identifier for a downlink BWP (e.g., uplink scheduling DCI 505-a and 505-b described with reference to FIG. 5). In some cases, the base station 105-b may map the identifiers for both the uplink and downlink BWPs to an index value, and include that index value in the uplink scheduling DCI 725 (e.g., uplink scheduling DCI 505-b described with reference to FIG. 5).

In some cases of a downlink BWP switching event in paired spectrum, the base station 105-b may generate downlink scheduling DCI along with the uplink scheduling DCI 725 (e.g., DCIs 405 and 410 described with reference to FIG. 4). In such cases, the combination of both DCIs may indicate that a downlink BWP switching event is occurring, and that a CSI report for the new downlink BWP should be communicated using PUSCH resources associated with the uplink scheduling DCI.

In some cases, each example of uplink scheduling DCI 725 may be modified for an SCell activation event. In such modifications, the uplink scheduling DCI 725 may include an A-CSI request, but cell identifier(s) of the SCell(s) to be activated may be included in the uplink scheduling DCI 725.

At 730, the UE 115-b may identify the A-CSI request and the downlink BWP, based at least in part on receiving the uplink scheduling DCI 725. In some cases, the UE 115-b may determine that the BWP identifier of the uplink scheduling DCI 725 is for a downlink BWP based at least in part on the uplink scheduling DCI 725 including a request for an A-CSI report. In such cases, if the uplink scheduling DCI 725 does not include an A-CSI request, the UE 115-b may determine that the BWP identifier in the uplink scheduling DCI 725 is for an uplink BWP. In some cases, the UE 115-b may identify that the uplink scheduling DCI 725 includes an index value. In such cases, the UE 115-b may identify the downlink BWP based on de-mapping the index value. In some cases, the UE 115-b may also receive a downlink scheduling DCI, and may identify the A-CSI request and/or the downlink BWP based on both the uplink and the downlink scheduling DCIs. In the case of an SCell activation event, the BWP identifiers may be modified to be SCell identifiers.

At 735, the UE 115-*b* may perform a BWP switching event or an SCell activation event based on receiving the uplink scheduling DCI 725. In some cases, the UE 115-*b* may perform a downlink BWP switching event after receiving an uplink scheduling DCI 725. In such cases, the uplink scheduling DCI 725 may include an identifier for a new downlink BWP to be used in the BWP switching event and the CSI measurements.

At 740, the UE 115-*b* may perform one or more CSI measurements using the BWP or the SCell included in the uplink scheduling DCI 725. CSI measurements may include any measurement or function needed to determine a CSI requested by the base station 105-*b*. Upon performing the CSI measurements, the UE 115-*b* may generate and transmit a CSI report 745 on PUSCH.

Figure 8:
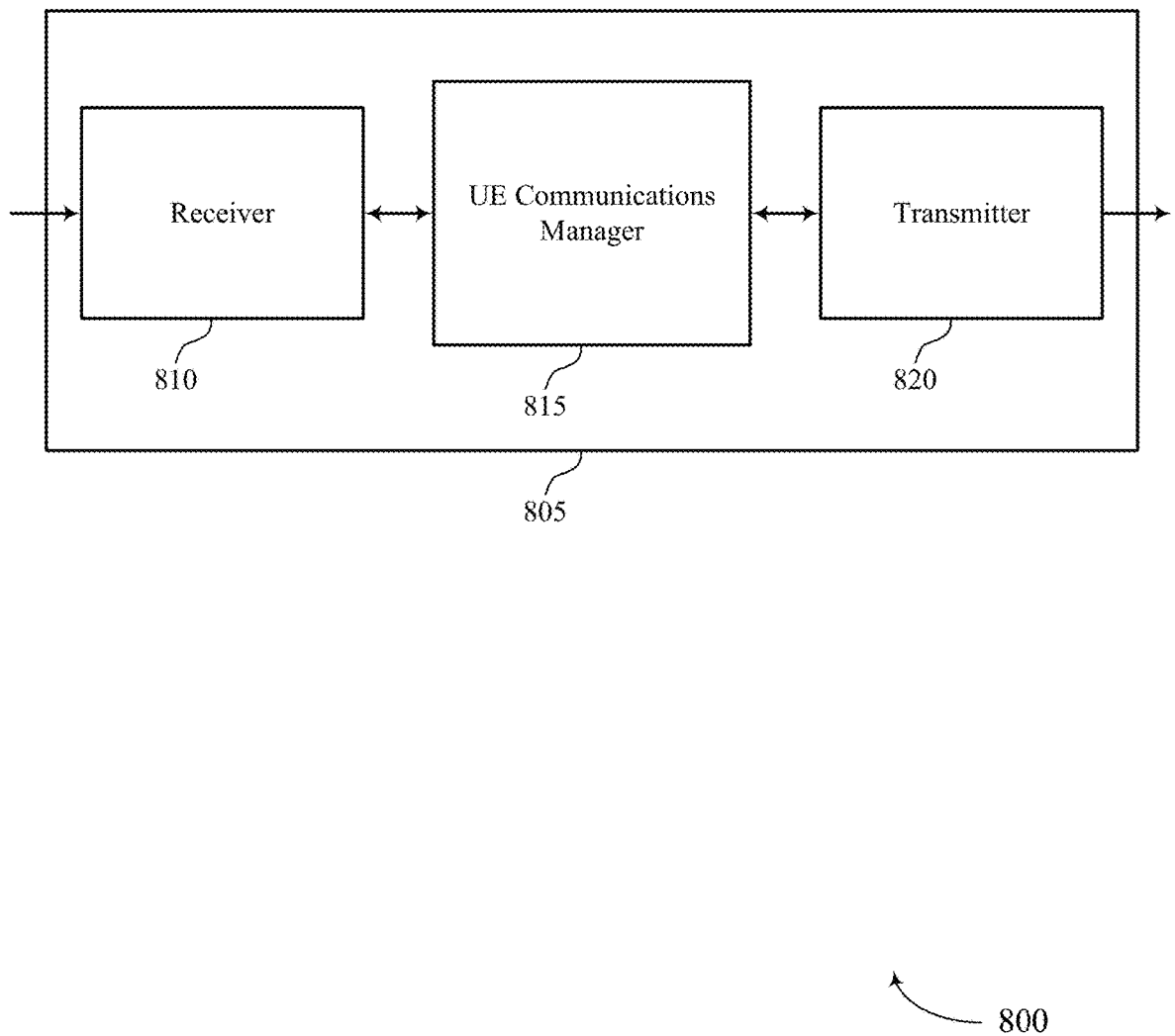
FIGS. 8 through 10 show block diagrams of a device that supports techniques for signaling a channel state information request and a communication link event in accordance with aspects of the present disclosure.

FIG. 8 shows a block diagram 800 of a wireless device 805 that supports techniques for signaling a channel state information request and a communication link event in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for signaling a channel state information request and a communication link event, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive uplink scheduling DCI, the uplink scheduling DCI including an A-CSI request and an indication of a downlink BWP associated with the A-CSI request, perform a CSI measurement based on the A-CSI request using the indicated downlink BWP, and transmit a CSI report based on the CSI measurement to a base station.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
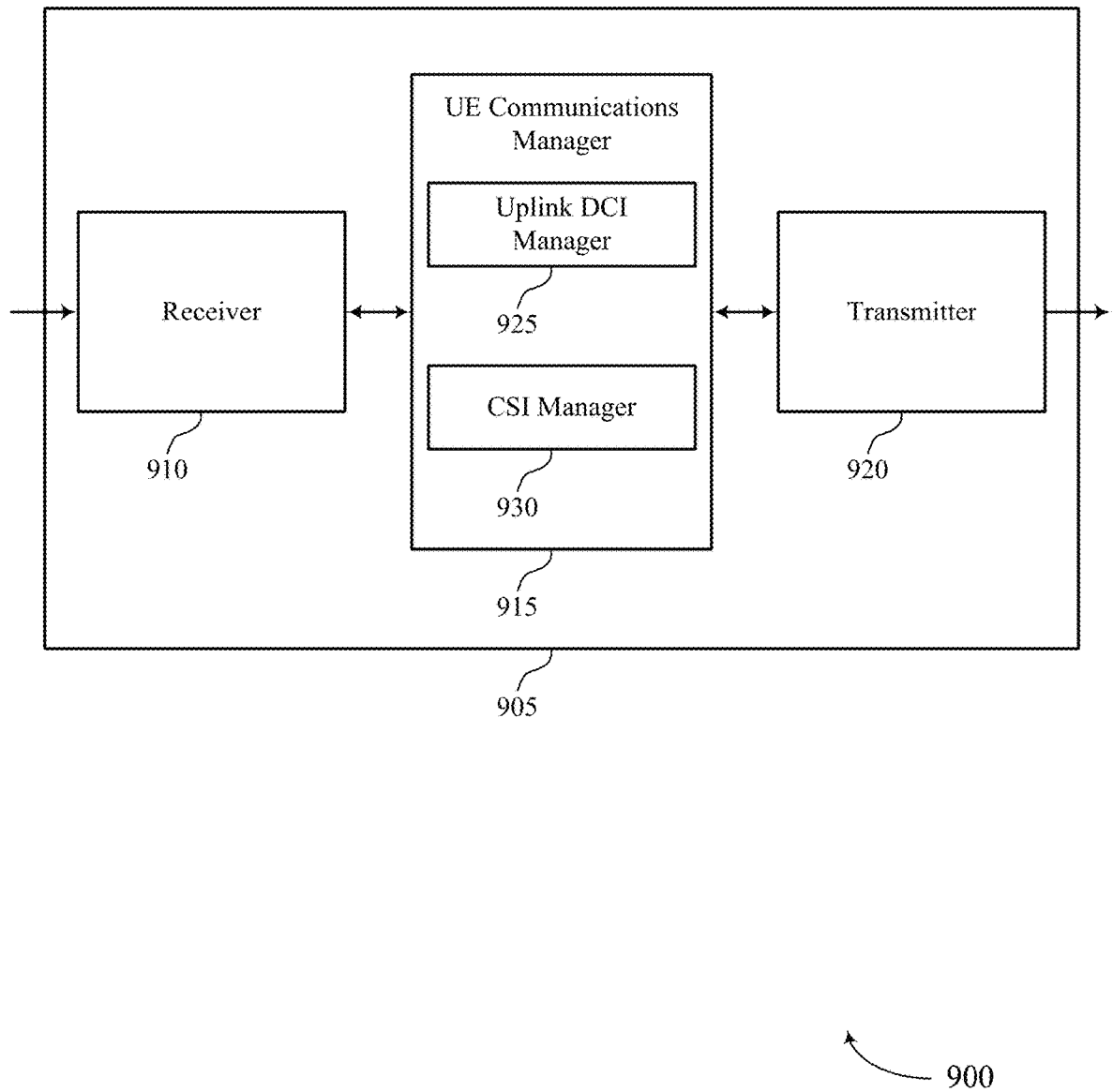

FIG. 9 shows a block diagram 900 of a wireless device 905 that supports techniques for signaling a channel state information request and a communication link event in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for signaling a channel state information request and a communication link event, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include uplink DCI manager 925 and CSI manager 930.

Uplink DCI manager 925 may receive uplink scheduling DCI, the uplink scheduling DCI including an A-CSI request and an indication of a downlink BWP associated with the A-CSI request. In some cases, the uplink scheduling DCI is exclusive of an uplink BWP. In some cases, the uplink scheduling DCI includes the A-CSI request, the downlink BWP, and an uplink BWP. Uplink DCI manager 925 may include an indication of one or more component carriers or secondary cells associated with the A-CSI request.

In some cases, CSI manager 930 may receive a first A-CSI configuration for CSI reporting using the PUSCH and a second A-CSI configuration for CSI reporting using the PUCCH, where the first A-CSI configuration is different from the second A-CSI configuration. For example, these separate configurations may be received in the same or different RRC messages.

In some examples, the uplink scheduling DCI is a first uplink scheduling DCI and the A-CSI request is a first A-CSI request, and uplink DCI manager 925 may further receive a second DCI including a second A-CSI request and an indication of the downlink BWP, where the downlink BWP is associated with both the first A-CSI request and the second A-CSI request.

CSI manager 930 may perform a CSI measurement based on the A-CSI request using the indicated downlink BWP and transmit a CSI report based on the CSI measurement to a base station. In some cases, the CSI report is transmitted using PUSCH or a PUCCH. In some cases, CSI manager 930 may refrain from performing a periodic CSI measurement using the indicated downlink BWP based on the A-CSI request. Specifically, the CSI manager 930 may drop periodic CSI reporting for each component carrier that is scheduled for both periodic CSI (p-CSI) reporting and A-CSI reporting in the same transmission instance.

In some cases, the first uplink scheduling DCI may be associated with CSI reporting using a PUSCH and the second DCI is associated with CSI reporting using a PUCCH, and CSI manager 930 may detect a collision between the CSI reporting using the PUSCH and the CSI reporting using the PUCCH. In some examples, CSI manager 930 may return an error based on the detected collision. In some other examples, CSI manager 930 may select one of the PUSCH or the PUCCH for transmission of the CSI report based at least in part on the detected collision and a set configuration. In some other examples, CSI manager 930 may select one of the PUSCH or the PUCCH for transmission of the CSI report based at least in part on the detected collision and an order in which the first uplink scheduling DCI and the second DCI are received. In some other example, CSI manager 930 may select the PUCCH for transmission of a first CSI report on a primary cell and select the PUSCH for transmission of a second CSI report on a secondary cell based on the detected collision.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
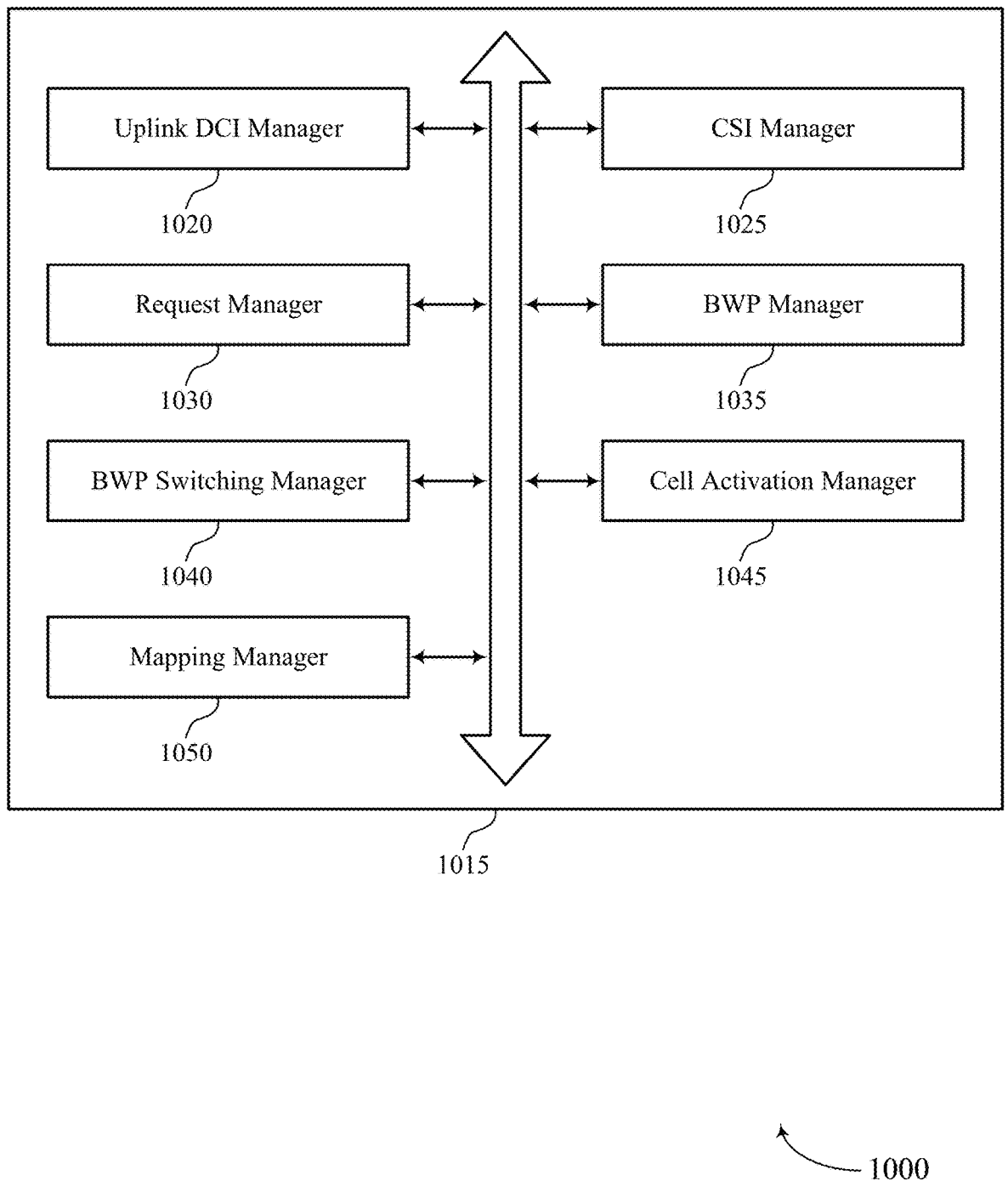

FIG. 10 shows a block diagram 1000 of a UE communications manager 1015 that supports techniques for signaling a channel state information request and a communication link event in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include uplink DCI manager 1020, CSI manager 1025, request manager 1030, BWP manager 1035, BWP switching manager 1040, cell activation manager 1045, and mapping manager 1050. Each of these modules may communicate, directly or indirectly, with one another (e.g., via one or more buses).

Uplink DCI manager 1020 may receive uplink scheduling DCI, the uplink scheduling DCI including an A-CSI request and an indication of a downlink BWP associated with the A-CSI request. In some cases, the uplink scheduling DCI is exclusive of an uplink BWP. In some cases, the uplink scheduling DCI includes the A-CSI request, the downlink BWP, and an uplink BWP. Uplink DCI manager 1020 may include an indication of one or more component carriers or secondary cells associated with the A-CSI request.

In some cases, as discussed above, the wireless device may be configured with a first A-CSI configuration for CSI reporting using the PUSCH and a second A-CSI configuration for CSI reporting using the PUCCH. These A-CSI configurations may be different from each other, and may be received or otherwise indicated to the UE using one or more RRC messages from a base station.

In some examples, the uplink scheduling DCI may include a first uplink scheduling DCI and the A-CSI request comprises a first A-CSI request, and uplink DCI manager 1020 may further receive a second uplink scheduling DCI including a second A-CSI request and an indication of the downlink BWP, where the downlink BWP is associated with both the first A-CSI request and the second A-CSI request.

CSI manager 1025 may perform a CSI measurement based on the A-CSI request using the indicated downlink BWP and transmit a CSI report based on the CSI measurement to a base station. In some cases, the CSI report is transmitted using PUSCH or a PUCCH. In some cases, CSI manager 930 may selectively drop, or refrain from transmitting, a periodic CSI report on the same component carrier and during the same time instance or slot as an A-CSI report is transmitted.

In some cases, the first uplink scheduling DCI may be associated with CSI reporting using a PUSCH, while the second DCI with CSI reporting using a PUCCH. In some cases, a collision may exist between the CSI reporting using the PUSCH and the CSI reporting using the PUCCH. For instance, an A-CSI report may be scheduled during the same time instance or slot using both PUSCH resources and PUCCH resources. In some examples, CSI manager 1025 may identify an error condition based at least in part on the collision. In some other examples, CSI manager 1025 may select one of the PUSCH or the PUCCH for transmission of the CSI report based on the collision and a set configuration. In some other examples, CSI manager 1025 may select one of the PUSCH or the PUCCH for transmission of the CSI report based on the collision and an order in which the first uplink scheduling DCI and the second DCI are received. In some other examples, CSI manager 1025 may select the PUCCH for transmission of a first CSI report on a primary cell and select the PUSCH for transmission of a second CSI report on a secondary cell.

Request manager 1030 may identify a value of an A-CSI request field of the uplink scheduling DCI, the uplink scheduling DCI being associated with a paired spectrum.

BWP manager 1035 may determine whether a BWP field of the uplink scheduling DCI includes a BWP identifier for the downlink BWP or an uplink BWP based on identifying the value of the A-CSI request field. Further, when the value of the A-CSI request field triggers A-CSI reporting, the BWP identifier may be for the downlink BWP, whereas when the value of the A-CSI request field does not trigger A-CSI reporting, the BWP identifier may be for the uplink BWP. In some cases, the downlink BWP includes a dynamically-configured number of contiguous physical resource blocks at a dynamically-configured frequency location in a radio frequency spectrum band.

BWP switching manager 1040 may perform a BWP switching event based on receiving the uplink scheduling DCI that includes the downlink BWP, where performing the CSI measurement is based on performing the BWP switching event.

Cell activation manager 1045 may perform a secondary cell activation event based on receiving the uplink scheduling DCI that includes the secondary cell, where performing the CSI measurement is based on performing the secondary cell activation event.

Mapping manager 1050 may identify an index value included in the uplink scheduling DCI, the index value being based on the downlink BWP and an uplink BWP and identify the downlink BWP and the uplink BWP included in the uplink scheduling DCI based on the index value, where performing the CSI measurement based on identifying the downlink BWP.

Figure 11:
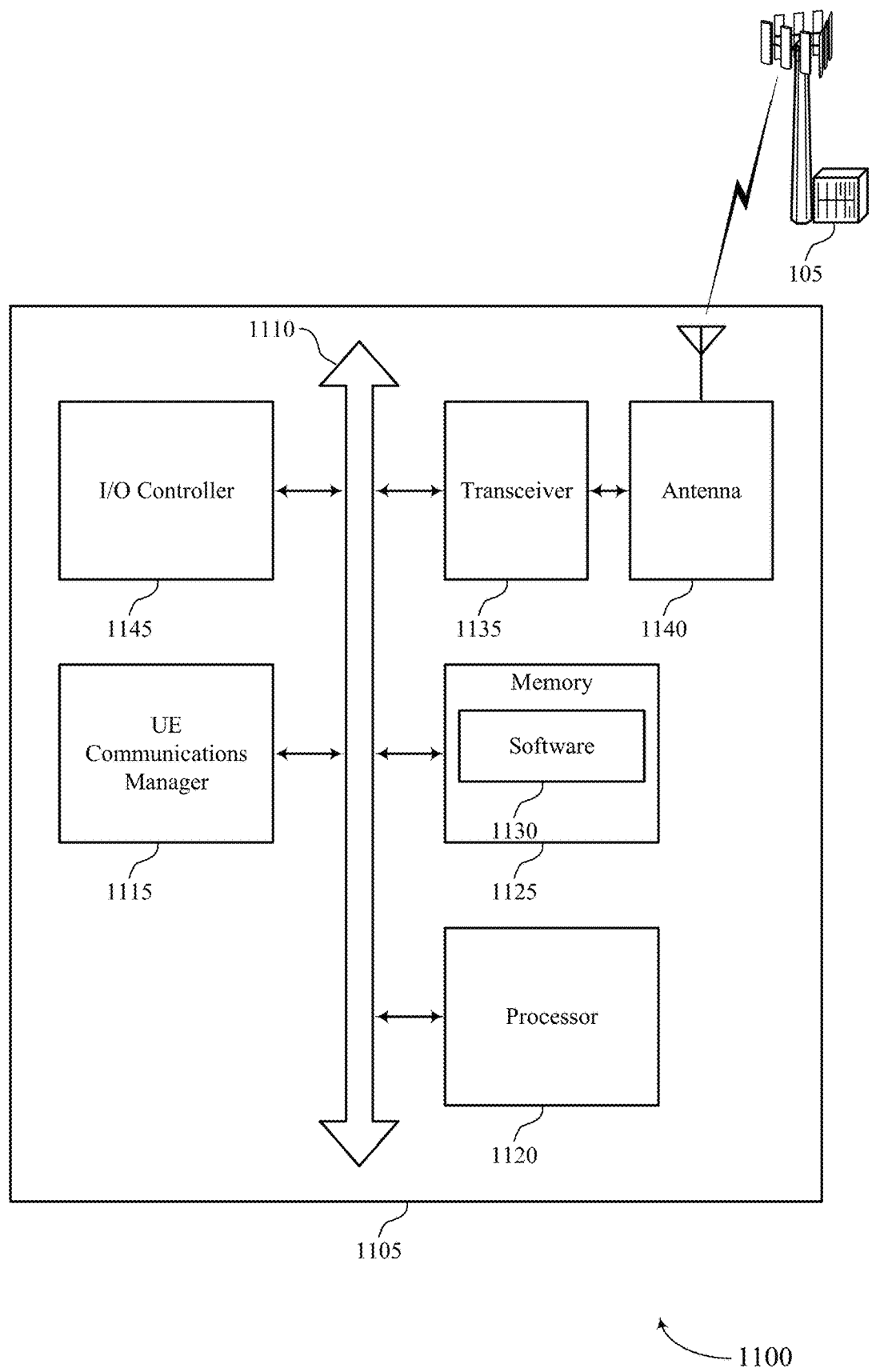
FIG. 11 illustrates a block diagram of a system including a UE that supports techniques for signaling a channel state information request and a communication link event in accordance with aspects of the present disclosure.

FIG. 11 shows a diagram of a system 1100 including a device 1105 that supports techniques for signaling a channel state information request and a communication link event in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for signaling a channel state information request and a communication link event).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support techniques for signaling a channel state information request and a communication link event. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
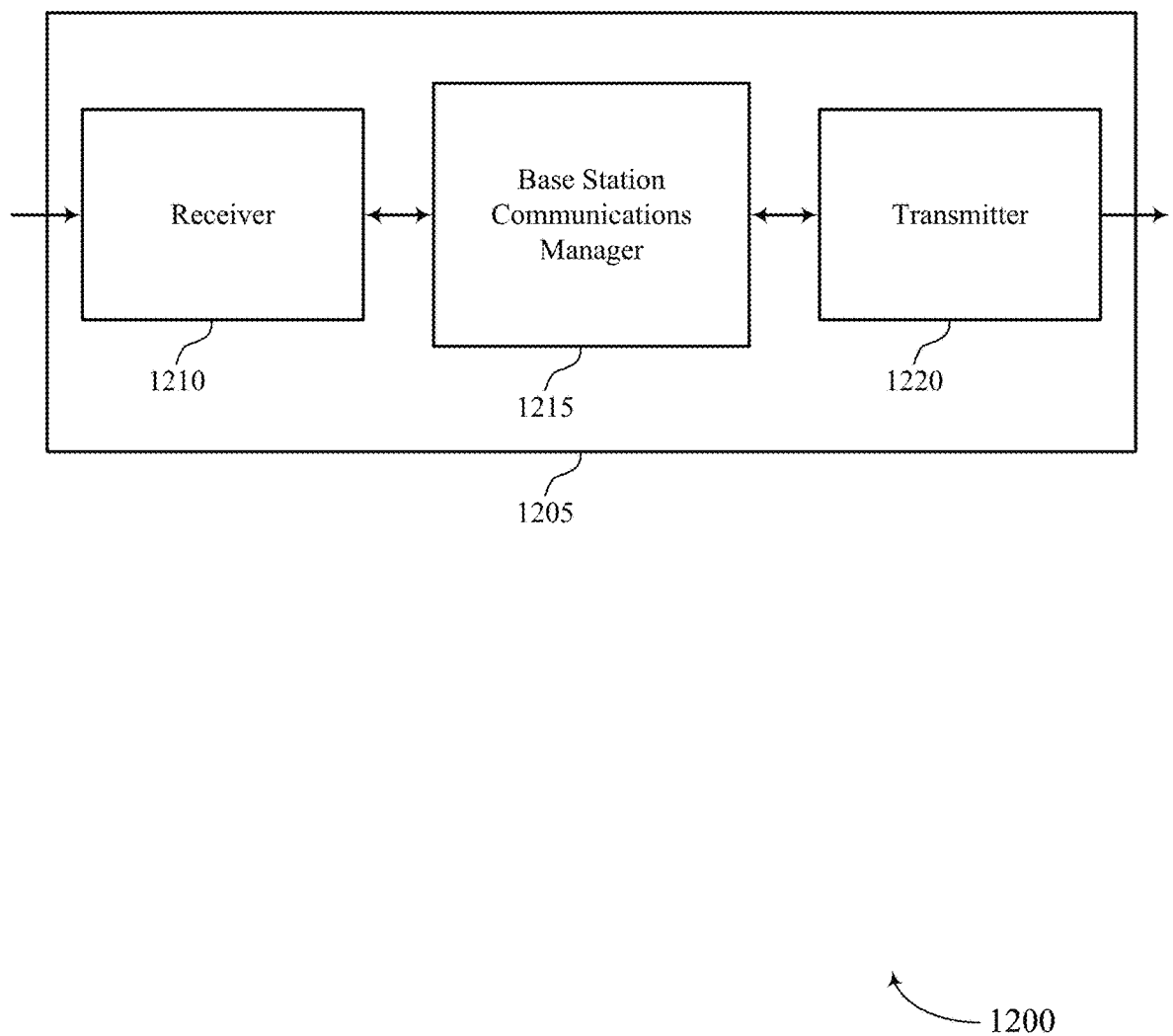
FIGS. 12 through 14 show block diagrams of a device that supports techniques for signaling a channel state information request and a communication link event in accordance with aspects of the present disclosure.

FIG. 12 shows a block diagram 1200 of a wireless device 1205 that supports techniques for signaling a channel state information request and a communication link event in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques for signaling a channel state information request and a communication link event, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may identify an occurrence of a BWP switching event or a secondary cell activation event associated with a UE, identify an A-CSI request and an indication of a downlink bandwidth part associated with the A-CSI based on identifying the occurrence, and transmit uplink scheduling DCI to the UE that includes the A-CSI request and the indication of the downlink BWP.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
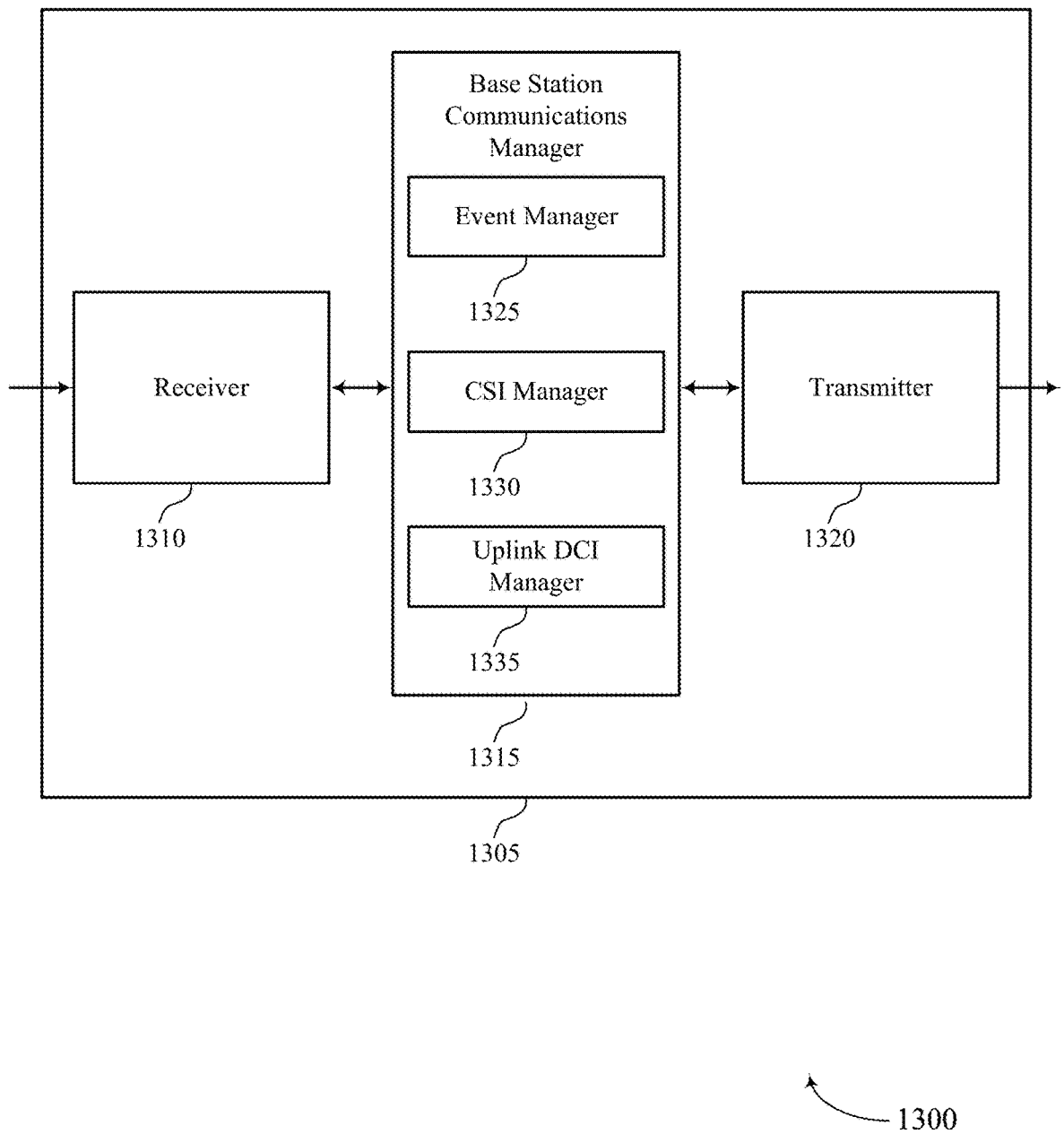

FIG. 13 shows a block diagram 1300 of a wireless device 1305 that supports techniques for signaling a channel state information request and a communication link event in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for signaling a channel state information request and a communication link event, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include event manager 1325, CSI manager 1330, and uplink DCI manager 1335.

Event manager 1325 may identify an occurrence of a BWP switching event or a secondary cell activation event associated with a UE.

CSI manager 1330 may identify an A-CSI request and an indication of a downlink bandwidth part associated with the A-CSI request based on identifying the occurrence and receive a CSI report using a PUSCH or a PUCCH from the UE based at least in part transmitting the uplink scheduling DCI.

Uplink DCI manager 1335 may transmit uplink scheduling DCI to the UE that includes the A-CSI request and the indication of the downlink BWP or the secondary cell. In some cases, the uplink scheduling DCI is exclusive of an uplink BWP. In some cases, the uplink scheduling DCI includes the A-CSI request, the downlink BWP, and an uplink BWP. Uplink DCI manager 1335 may include an indication of one or more component carriers or secondary cells associated with the A-CSI request.

In some cases, CSI manager 1330 may configure a UE, such as one of the UEs 115 or wireless devices 805, 905 described above, with a first A-CSI configuration for CSI reporting using the PUSCH and a second A-CSI configuration for CSI reporting using the PUCCH, with the first A-CSI configuration being different from the second A-CSI configuration In some examples, the uplink scheduling DCI may be a first uplink scheduling DCI and the A-CSI request may be a first A-CSI request, and uplink DCI manager 1335 may further transmit a second uplink scheduling DCI including a second A-CSI request and an indication of the downlink BWP, where the downlink BWP is associated with both the first A-CSI request and the second A-CSI request.

In some cases, the first uplink scheduling DCI may be associated with CSI reporting using a PUSCH and the second DCI is associated with CSI reporting using a PUCCH, and a collision may exist between the CSI reporting using the PUSCH and the CSI reporting using the PUCCH. For example, in some cases, the CSI reporting using the PUSCH and the CSI reporting using the PUCCH may be scheduled during the same time instance or slot using the same frequency instances (e.g., CCs or BWPs). In such cases, CSI manager 1330 may identify an error condition based on the collision. In some other examples, CSI manager 1330 may select one of the PUSCH or the PUCCH to receive the CSI report based on the collision and a set configuration. In some other examples, CSI manager 1330 may select one of the PUSCH or the PUCCH to receive the CSI report based on the collision and an order in which the first uplink scheduling DCI and the second DCI are transmitted. In some other examples, CSI manager 1330 may receive a first CSI report using the PUCCH on a primary cell and receive a second CSI report using the PUSCH on a secondary cell. In some examples, the first CSI report and the second CSI report may be the same.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
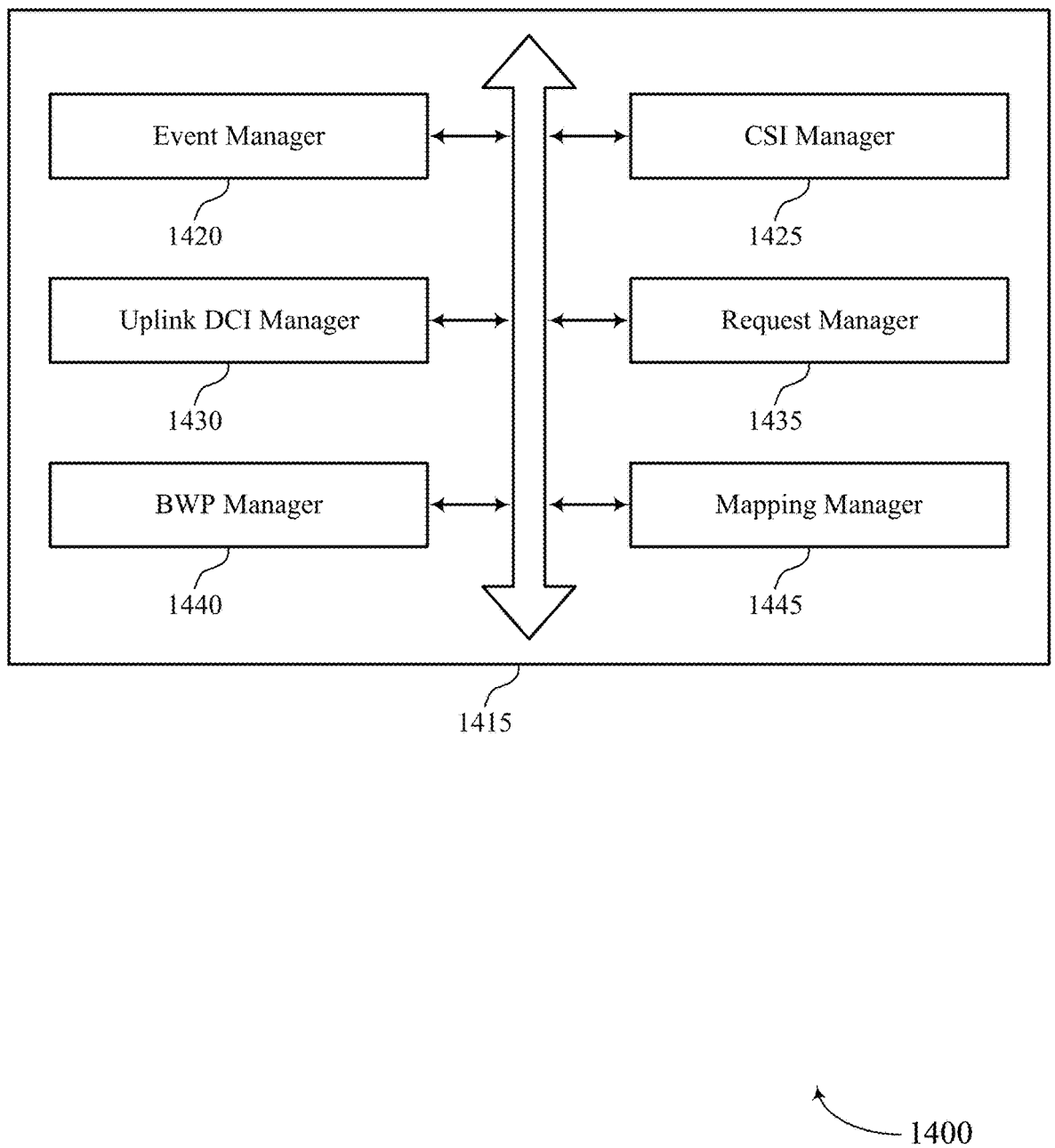

FIG. 14 shows a block diagram 1400 of a base station communications manager 1415 that supports techniques for signaling a channel state information request and a communication link event in accordance with aspects of the present disclosure. The base station communications manager 1415 may be an example of aspects of a base station communications manager 1515 described with reference to FIGS. 12, 13, and 15. The base station communications manager 1415 may include event manager 1420, CSI manager 1425, uplink DCI manager 1430, request manager 1435, BWP manager 1440, and mapping manager 1445. Each of these modules may communicate, directly or indirectly, with one another (e.g., via one or more buses).

Event manager 1420 may identify an occurrence of a BWP switching event or a secondary cell activation event associated with a UE.

CSI manager 1425 may identify an A-CSI request and an indication of a downlink bandwidth part associated with the A-CSI request based on identifying the occurrence, and receive a CSI report using PUSCH from the UE based at least in part on transmitting the uplink scheduling DCI.

Uplink DCI manager 1430 may transmit uplink scheduling DCI to the UE that includes the A-CSI request and the indication of the downlink BWP of the secondary cell. In some cases, the uplink scheduling DCI is exclusive of an uplink BWP. In some cases, the uplink scheduling DCI includes the A-CSI request, the downlink BWP, and an uplink BWP. Uplink DCI manager 1430 may include an indication of one or more component carriers or secondary cells associated with the A-CSI request.

In some examples, the uplink scheduling DCI may be a first uplink scheduling DCI and the A-CSI request may be a first A-CSI request, and uplink DCI manager 1430 may further transmit a second uplink scheduling DCI including a second A-CSI request and an indication of the downlink BWP, where the downlink BWP is associated with both the first A-CSI request and the second A-CSI request.

In some cases, the first uplink scheduling DCI may be associated with CSI reporting using a PUSCH and the second DCI is associated with CSI reporting using a PUCCH. The CSI reporting using the PUSCH and the CSI reporting using the PUCCH may collide. In some examples, CSI manager 1425 may identify an error condition based on the collision. In some other examples, CSI manager 1425 may select one of the PUSCH or the PUCCH to receive the CSI report based on the collision and a set configuration. In some other examples, CSI manager 1425 may select one of the PUSCH or the PUCCH to receive the CSI report based on the collision and an order in which the first uplink scheduling DCI and the second DCI are transmitted. In some other example, CSI manager 1425 may receive a first CSI report using the PUCCH on a primary cell and receive a second CSI report using the PUSCH on a secondary cell based on the collision. In some examples, the first CSI report and the second CSI report may be the same.

Request manager 1435 may determine a value of an A-CSI request field of the uplink scheduling DCI, the uplink scheduling DCI being associated with a paired spectrum.

BWP manager 1440 may determine whether a BWP field of the uplink scheduling DCI includes a BWP identifier for the downlink BWP or an uplink BWP based on determining the value of the A-CSI request field. In some aspects, when the value of the A-CSI request field triggers A-CSI reporting, the BWP identifier may be for the downlink BWP, and when the value of the A-CSI request field does not trigger A-CSI reporting, the BWP identifier may be for the uplink BWP. In some cases, the downlink BWP includes a dynamically-configured number of contiguous physical resource blocks at a dynamically-configured frequency location in a radio frequency spectrum band.

Mapping manager 1445 may map the downlink BWP and the uplink BWP to an index value, where the uplink scheduling DCI includes the index value.

Figure 15:
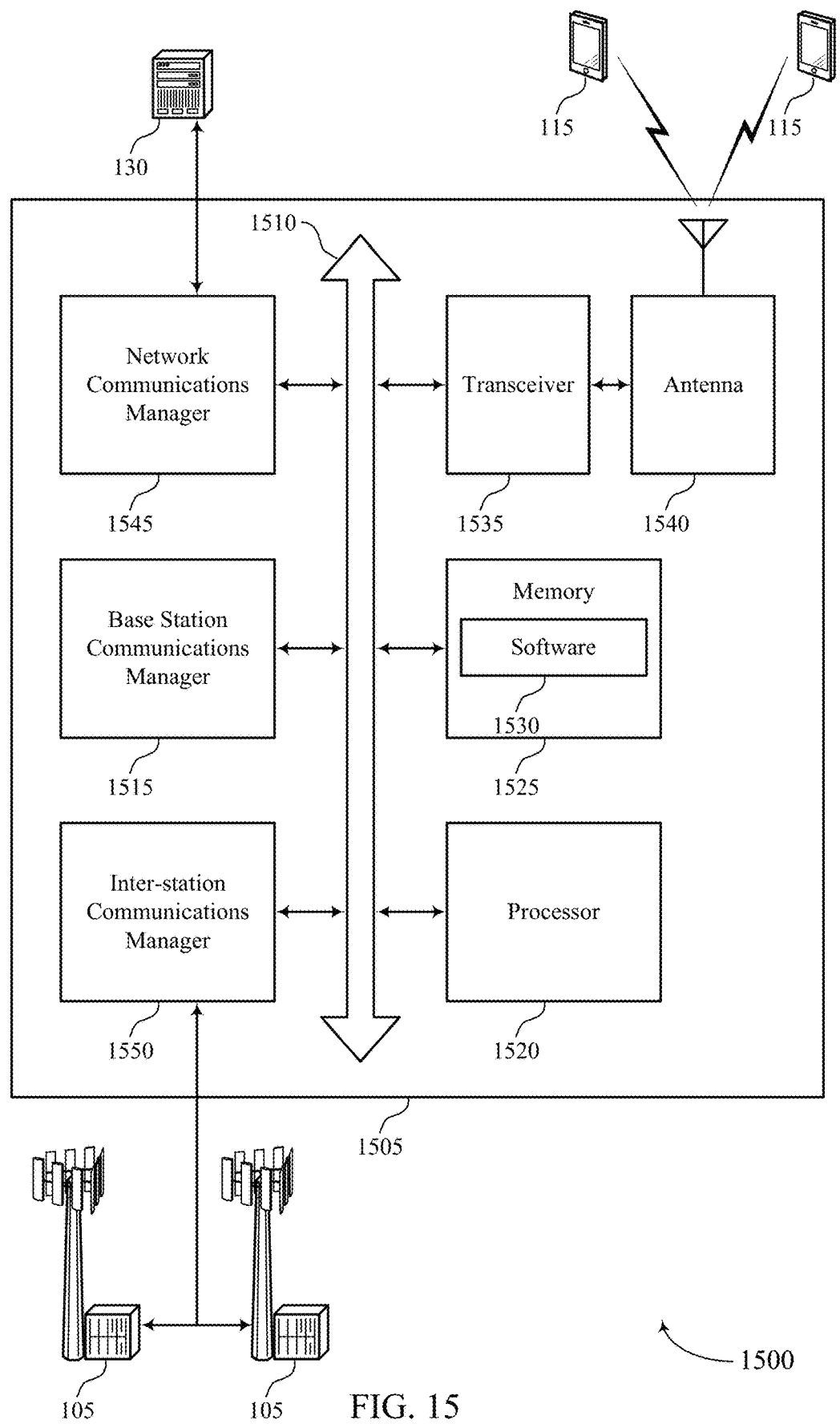
FIG. 15 illustrates a block diagram of a system including a base station that supports techniques for signaling a channel state information request and a communication link event in accordance with aspects of the present disclosure.

FIG. 15 shows a diagram of a system 1500 including a device 1505 that supports techniques for signaling a channel state information request and a communication link event in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting techniques for signaling a channel state information request and a communication link event).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support techniques for signaling a channel state information request and a communication link event. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases, the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
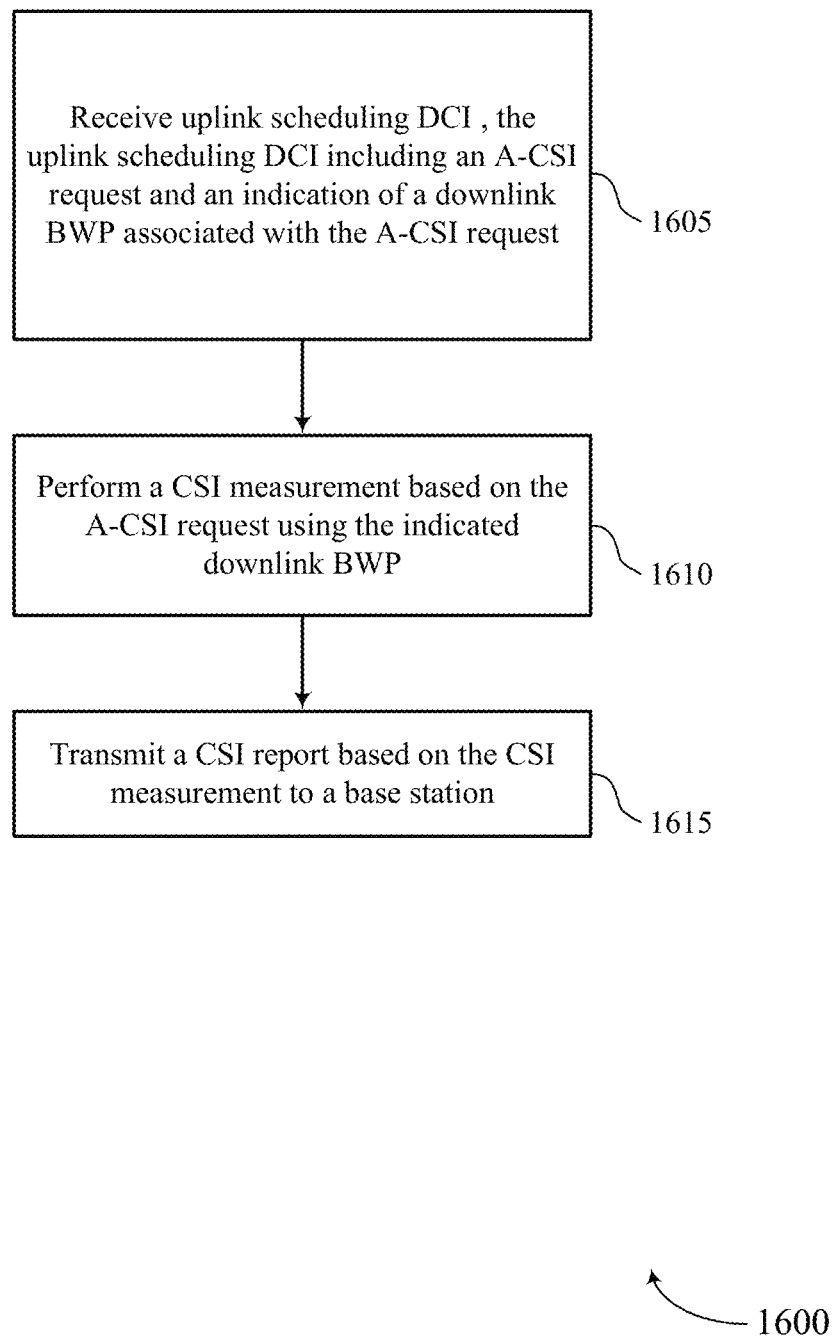
FIGS. 16 through 17 illustrate methods for signaling a channel state information request and a communication link event in accordance with aspects of the present disclosure.

FIG. 16 shows a flowchart illustrating a method 1600 for signaling a channel state information request and a communication link event in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may receive uplink scheduling DCI, the uplink scheduling DCI comprising an A-CSI request and an indication of a downlink BWP associated with the A-CSI request. The operations of 1605 may be performed according to the methods described herein. In certain examples, aspects of the operations of 1605 may be performed by an uplink DCI manager as described with reference to FIGS. 8 through 11.

At 1610, the UE 115 may perform a CSI measurement based at least in part on the A-CSI request using the indicated downlink BWP or the indicated secondary cell. The operations of 1610 may be performed according to the methods described herein. In certain examples, aspects of the operations of 1610 may be performed by a CSI manager as described with reference to FIGS. 8 through 11.

At 1615, the UE 115 may transmit a CSI report based on the CSI measurement to a base station. The operations of 1615 may be performed according to the methods described herein. In certain examples, aspects of the operations of 1615 may be performed by a CSI manager as described with reference to FIGS. 8 through 11.

Figure 17:
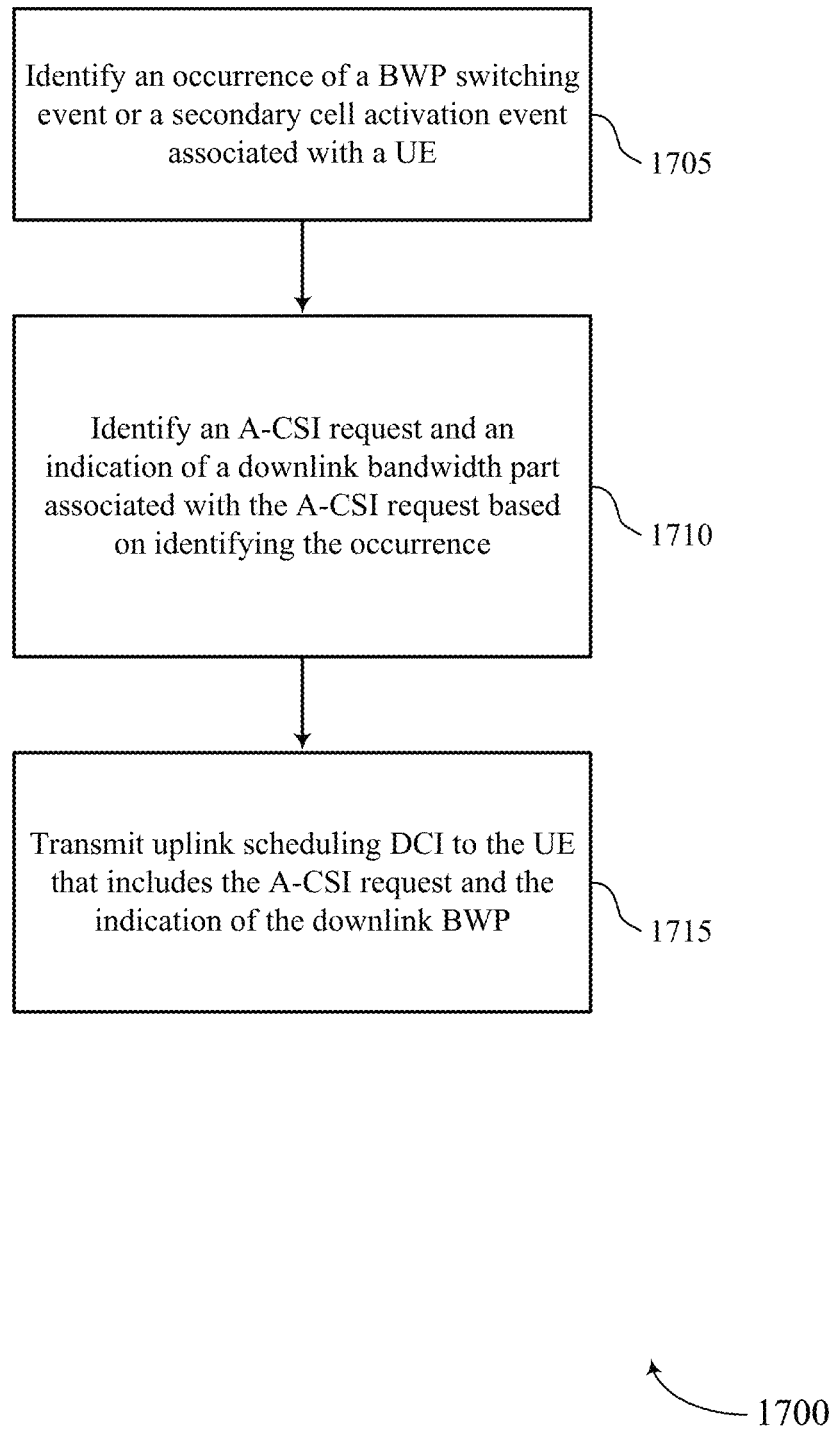

FIG. 17 shows a flowchart illustrating a method 1700 for signaling a channel state information request and a communication link event in accordance with aspects of the present disclosure. The operations of method 1700 may be implemented by a base station 105 or its components as described herein. For example, the operations of method 1700 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1705, the base station 105 may identify an occurrence of a BWP switching event or a secondary cell activation event associated with a UE. The operations of 1705 may be performed according to the methods described herein. In certain examples, aspects of the operations of 1705 may be performed by an event manager as described with reference to FIGS. 12 through 15.

At 1710, the base station 105 may identify an A-CSI request and an indication of a downlink bandwidth part associated with the A-CSI request based at least in part on identifying the occurrence. The operations of 1710 may be performed according to the methods described herein. In certain examples, aspects of the operations of 1710 may be performed by a CSI manager as described with reference to FIGS. 12 through 15.

At 1715, the base station 105 may transmit uplink scheduling DCI to the UE that includes the A-CSI request and the indication of the downlink BWP. The operations of 1715 may be performed according to the methods described herein. In certain examples, aspects of the operations of 1715 may be performed by an uplink DCI manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
  receiving uplink scheduling downlink control information (DCI) comprising an aperiodic channel state information (A-CSI) request and an indication of a downlink bandwidth part (BWP) associated with the A-CSI request;
  performing a CSI measurement based at least in part on the A-CSI request using the indicated downlink BWP;
  transmitting a CSI report based on the CSI measurement to a base station;
  receiving a first A-CSI configuration for CSI reporting using a physical uplink shared channel (PUSCH); and
  receiving a second A-CSI configuration for CSI reporting using a physical uplink control channel (PUCCH), wherein the first A-CSI configuration is different from the second A-CSI configuration.

2. The A method for wireless communication comprising:
  receiving uplink scheduling downlink control information (PCI) comprising an aperiodic channel state information (A-CSI) request and an indication of a downlink bandwidth part (BWP) associated with the A-CSI request, wherein the uplink scheduling DCI comprises a first uplink scheduling DCI and the A-CSI request comprises a first A-CSI request;
  performing a CCI measurement based at least in part on the A-CSI request using the indicated downlink BWP;
  transmitting a CSI report based on the CSI measurement to a base station; and
  receiving a second DCI comprising a second A-CSI request and an indication of the downlink BWP, wherein the downlink BWP is associated with both the first A-CSI request and the second A-CSI request.

3. The method of claim 2, wherein the first uplink scheduling DCI is associated with CSI reporting using a physical uplink shared channel (PUSCH) and the second DCI is associated with CSI reporting using a physical uplink control channel (PUCCH), and the method further comprising:

detecting a collision between the CSI reporting using the PUSCH and the CSI reporting using the PUCCH.

4. The method of claim 3, further comprising:
returning an error based at least in part on the detected collision.

5. The method of claim 3, further comprising:
selecting one of the PUSCH or the PUCCH for transmission of the CSI report based at least in part on the detected collision and a set configuration.

6. The method of claim 3, further comprising:
selecting one of the PUSCH or the PUCCH for transmission of the CSI report based at least in part on the detected collision and an order in which the first uplink scheduling DCI and the second DCI are received.

7. The method of claim 3, further comprising:
selecting the PUCCH for transmission of a first CSI report on a primary cell; and
selecting the PUSCH for transmission of a second CSI report on a secondary cell.

8. The method of claim 2, further comprising:
refraining from performing a periodic CSI measurement using the downlink BWP based at least in part on the A-CSI request.

9. A method for wireless communication, comprising:
receiving uplink scheduling downlink control information (DCI) comprising an aperiodic channel state information (A-CSI) request and an indication of a downlink bandwidth part (BWP) associated with the A-CSI request;
performing a CSI measurement based at least in part on the A-CSI request using the indicated downlink BWP;
transmitting a CSI report based on the CSI measurement to a base station;
identifying a value of an A-CSI request field of the uplink scheduling DCI, the uplink scheduling DCI being associated with a paired spectrum; and
determining whether a BWP field of the uplink scheduling DCI includes a BWP identifier for the downlink BWP or an uplink BWP based at least in part on identifying the value of the A-CSI request field.

10. The method of claim 9, further comprising:
when the value of the A-CSI request field triggers A-CSI reporting, the BWP identifier is for the downlink BWP.

11. The method of claim 9, further comprising:
when the value of the A-CSI request field does not trigger A-CSI reporting, the BWP identifier is for the uplink BWP.

12. The method of claim 9, wherein the uplink scheduling DCI is exclusive of an uplink BWP.

13. A method for wireless communication, further comprising:
receiving uplink scheduling downlink control information (DCI) comprising an aperiodic channel state information (A-CSI) request and an indication of a downlink bandwidth part (BWP) associated with the A-CSI request;
performing a CSI measurement based at least in part on the A-CSI request using the indicated downlink BWP;
transmitting a CSI report based on the CSI measurement to a base station; and
performing a BWP switching event based at least in part on receiving the uplink scheduling DCI that includes the downlink BWP, wherein performing the CSI measurement is based at least in part on performing the BWP switching event.

14. A method for wireless communication, comprising:
receiving uplink scheduling downlink control information (DCI) comprising an aperiodic channel state information (A-CSI) request and an indication of a downlink bandwidth part (BWP) associated with the A-CSI request;
performing a CSI measurement based at least in part on the A-CSI request using the indicated downlink BWP; and
transmitting a CSI report based on the CSI measurement to a base station,
wherein the uplink scheduling DCI includes the A-CSI request, the downlink BWP, and an uplink BWP.

15. A method for wireless communication, comprising:
receiving uplink scheduling downlink control information (DCI) comprising an aperiodic channel state information (A-CSI) request and an indication of a downlink bandwidth part (BWP) associated with the A-CSI request;
performing a CSI measurement based at least in part on the A-CSI request using the indicated downlink BWP;
transmitting a CSI report based on the CSI measurement to a base station;
identifying an index value included in the uplink scheduling DCI, the index value being based at least in part on the downlink BWP and an uplink BWP; and
identifying the downlink BWP and the uplink BWP included in the uplink scheduling DCI based at least in part on the index value, wherein performing the CSI measurement based at least in part on identifying the downlink BWP.

16. The method of claim 9, wherein the downlink BWP includes a dynamically-configured number of contiguous physical resource blocks at a dynamically configured frequency location in a radio frequency spectrum band.

17. The method of claim 9, wherein the CSI report is transmitted using a physical uplink shared channel (PUSCH) or a physical uplink control channel (PUCCH).

18. A method for wireless communication, comprising:
identifying an occurrence of a bandwidth part (BWP) switching event or a secondary cell activation event associated with a user equipment (UE);
identifying an aperiodic channel state information (A-CSI) request and an indication of a downlink BWP associated with the A-CSI request based at least in part on identifying the occurrence;
transmitting uplink scheduling downlink control information (DCI) to the UE that includes the A-CSI request and the indication of the downlink BWP;
receiving a CSI report using a physical uplink shared channel (PUSCH) or a physical uplink control channel (PUCCH) from the UE based at least in part on transmitting the uplink scheduling DCI;
transmitting a first A-CSI configuration for CSI reporting using the PUSCH; and
transmitting a second A-CSI configuration for CSI reporting using the PUCCH, wherein the first A-CSI configuration is different from the second A-CSI configuration.

19. A method for wireless communication, comprising:
identifying an occurrence of a bandwidth part (BWP) switching event or a secondary cell activation event associated with a user equipment (UE);
identifying an aperiodic channel state information (A-CSI) request and an indication of a downlink BWP associated with the A-CSI request based at least in part on identifying the occurrence;

transmitting uplink scheduling downlink control information (DCI) to the UE that includes the A-CSI request and the indication of the downlink BWP, wherein the uplink scheduling DCI comprises a first uplink scheduling DCI and the A-CSI request comprises a first A-CSI request, wherein the first uplink scheduling DCI is associated with CSI reporting using a physical uplink shared channel (PUSCH); and transmitting a second DCI comprising a second A-CSI request and an indication of the downlink BWP, wherein the downlink BWP is associated with both the first A-CSI request and the second A-CSI request, and the second DCI is associated with CSI reporting using a physical uplink control channel (PUCCH), and wherein a collision exists between the CSI reporting using the PUSCH and the CSI reporting using the PUCCH.

20. The method of claim 19, further comprising:
identifying an error condition based at least in part on the collision.

21. The method of claim 19, further comprising:
selecting one of the PUSCH or the PUCCH to receive a CSI report based at least in part on the collision and a set configuration.

22. The method of claim 19, further comprising:
selecting one of the PUSCH or the PUCCH to receive a CSI report based at least in part on the collision and an order in which the first uplink scheduling DCI and the second DCI are transmitted.

23. The method of claim 19, further comprising:
receiving a first CSI report using the PUCCH on a primary cell; and
receiving a second CSI report using the PUSCH on a secondary cell.

24. A method for wireless communication, comprising:
identifying an occurrence of a bandwidth part (BWP) switching event or a secondary cell activation event associated with a user equipment (UE);
identifying an aperiodic channel state information (A-CSI) request and an indication of a downlink BWP associated with the A-CSI request based at least in part on identifying the occurrence;
transmitting uplink scheduling downlink control information (DCI) to the UE that includes the A-CSI request and the indication of the downlink BWP;
determining a value of an A-CSI request field of the uplink scheduling DCI, the uplink scheduling DCI being associated with a paired spectrum; and
determining whether a BWP field of the uplink scheduling DCI includes a BWP identifier for the downlink BWP or an uplink BWP based at least in part on determining the value of the A-CSI request field.

25. An apparatus for wireless communication, comprising:
a processor,
memory in electronic communication with the processor; and
instructions stored in the memory and executable by the processor to cause the apparatus to:
receive uplink scheduling downlink control information (DCI) comprising an aperiodic channel state information (A-CSI) request and an indication of a downlink bandwidth part (BWP) associated with the A-CSI request;
perform a CSI measurement based at least in part on the A-CSI request using the indicated downlink BWP;
transmit a CSI report based on the CSI measurement to a base station;
identify a value of an A-CSI request field of the uplink scheduling DCL, the uplink scheduling DCI being associated with a paired spectrum; and
determine whether a BWP field of the uplink scheduling DCI includes a BWP identifier for the downlink BWP or an uplink BWP based at least in part on identifying the value of the A-CSI request field.

26. An apparatus for wireless communication, comprising:
a processor,
memory in electronic communication with the processor; and
instructions stored in the memory and executable by the processor to cause the apparatus to:
identify an occurrence of a bandwidth part (BWP) switching event or a secondary cell activation event associated with a user equipment (UE);
identify an aperiodic channel state information (A-CSI) request and an indication of a downlink bandwidth part associated with the A-CSI request based at least in part on identifying the occurrence;
transmit uplink scheduling downlink control information (DCI) to the UE that includes the A-CSI request and the indication of the downlink BWP, wherein the uplink scheduling DCI comprises a first uplink scheduling DCI and the A-CSI request comprises a first A-CSI request, wherein the first uplink scheduling DCI is associated with CSI reporting using a physical uplink shared channel (PUSCH); and
transmitting a second DCI comprising a second A-CSI request and an indication of the downlink BWP, wherein the downlink BWP is associated with both the first A-CSI request and the second A-CSI request, and the second DCI is associated with CSI reporting using a physical uplink control channel (PUCCH), and wherein a collision exists between the CSI reporting using the PUSCH and the CSI reporting using the PUCCH.

27. The method of claim 1, wherein the DCI comprises an indication of one or more component carriers associated with the A-CSI request.

28. The method of claim 27, further comprising:
performing a secondary cell activation event based at least in part on receiving the uplink scheduling DCI that includes the one or more component carriers, wherein performing the CSI measurement is based at least in part on performing the secondary cell activation event.

* * * * *